United States Patent
Rusak et al.

(10) Patent No.: US 10,762,892 B2
(45) Date of Patent: Sep. 1, 2020

(54) RAPID DEPLOYMENT OF DIALOGUE SYSTEM

(71) Applicant: Semantic Machines, Inc., Newton, MA (US)

(72) Inventors: Jesse Daniel Eskes Rusak, Somerville, MA (US); David Leo Wright Hall, Berkeley, CA (US); Jason Andrew Wolfe, San Francisco, CA (US); Daniel Lawrence Roth, Newton, MA (US); Daniel Klein, Orinda, CA (US); Jordan Rian Cohen, Kure Beach, NC (US)

(73) Assignee: Semantic Machines, Inc., Newton, MA (US)

(*) Notice: Subject to any disclaimer, the term of this patent is extended or adjusted under 35 U.S.C. 154(b) by 55 days.

(21) Appl. No.: 16/036,622

(22) Filed: Jul. 16, 2018

(65) Prior Publication Data

US 2019/0103092 A1    Apr. 4, 2019

Related U.S. Application Data

(63) Continuation-in-part of application No. 15/974,650, filed on May 8, 2018, which is a continuation-in-part (Continued)

(51) Int. Cl.
   *G10L 15/00* (2013.01)
   *G10L 15/18* (2013.01)
   (Continued)

(52) U.S. Cl.
   CPC ...... *G10L 15/063* (2013.01); *G06F 16/90332* (2019.01); *G06F 40/169* (2020.01);
   (Continued)

(58) Field of Classification Search
   CPC ...................................................... G10L 15/00
   See application file for complete search history.

(56) References Cited

U.S. PATENT DOCUMENTS 5,995,918 A    11/1999  Kendall et al.
6,173,261 B1    1/2001  Arai et al.
(Continued)

FOREIGN PATENT DOCUMENTS

EP    1352317 A2    10/2003
EP    3374880 A1    9/2018
(Continued)

OTHER PUBLICATIONS

"Final Office Action Issued in U.S. Appl. No. 15/669,795", dated Jan. 7, 2019, 19 Pages.
(Continued)

*Primary Examiner* — Shreyans A Patel
(74) *Attorney, Agent, or Firm* — Alleman Hall Creasman & Tuttle LLP

(57) ABSTRACT

A method for a dialogue system includes establishing a dialogue session between an application executing on a server and a remote machine. The dialogue session includes one or more utterances received from a user at the remote machine. A natural language processing machine identifies a request associated with a computer-readable representation of an utterance. A dialogue expansion machine generates a plurality of alternative actions for responding to the request. A previously-trained machine learning confidence model assesses a confidence score for each alternative. If a highest confidence score for a top alternative does not satisfy a threshold, the plurality of alternatives including the top alternative are transmitted to a remote machine (which may be the same remote machine or a different remote machine) for review by a human reviewer. After the dialogue system and/or the human reviewer select an alternative, computer-
(Continued)

readable instructions defining the selected alternative are executed.

20 Claims, 12 Drawing Sheets

Related U.S. Application Data of application No. 15/904,125, filed on Feb. 23, 2018, now Pat. No. 10,586,530.

(60) Provisional application No. 62/533,096, filed on Jul. 16, 2017, provisional application No. 62/503,248, filed on May 8, 2017, provisional application No. 62/462,736, filed on Feb. 23, 2017.

(51) Int. Cl.
| | |
|---|---|
| G10L 15/22 | (2006.01) |
| G10L 15/06 | (2013.01) |
| G10L 15/30 | (2013.01) |
| G06N 20/00 | (2019.01) |
| G06F 16/9032 | (2019.01) |
| G06N 3/04 | (2006.01) |
| G06N 3/00 | (2006.01) |
| G06N 3/08 | (2006.01) |
| G06F 40/35 | (2020.01) |
| G06F 40/169 | (2020.01) |
| G06N 7/00 | (2006.01) |
| G06N 20/10 | (2019.01) |

(52) U.S. Cl.
CPC .......... *G06F 40/35* (2020.01); *G06N 3/006* (2013.01); *G06N 3/0454* (2013.01); *G06N 3/084* (2013.01); *G06N 20/00* (2019.01); *G10L 15/22* (2013.01); *G10L 15/30* (2013.01); *G06N 3/0445* (2013.01); *G06N 3/0472* (2013.01); *G06N 7/005* (2013.01); *G06N 20/10* (2019.01); *G10L 2015/0638* (2013.01); *G10L 2015/225* (2013.01)

(56) References Cited

U.S. PATENT DOCUMENTS

| | | | |
|---|---|---|---|
| 6,173,266 B1 | 1/2001 | Marx et al. | |
| 6,192,343 B1 | 2/2001 | Morgan et al. | |
| 6,292,771 B1 | 9/2001 | Haug et al. | |
| 6,430,551 B1 | 8/2002 | Thelen et al. | |
| 7,133,827 B1 | 11/2006 | Gillick et al. | |
| 7,698,136 B1 | 4/2010 | Nguyen et al. | |
| 7,725,308 B2 | 5/2010 | Russell | |
| 7,933,774 B1 | 4/2011 | Begeja et al. | |
| 8,660,849 B2 | 2/2014 | Gruber et al. | |
| 8,706,486 B1 | 4/2014 | Devarajan et al. | |
| 9,104,754 B2 | 8/2015 | Wedeniwski | |
| 9,275,641 B1* | 3/2016 | Gelfenbeyn | G06F 40/205 |
| 9,280,610 B2 | 3/2016 | Gruber et al. | |
| 9,318,109 B2 | 4/2016 | Boies et al. | |
| 9,348,805 B1 | 5/2016 | Uszkoreit et al. | |
| 9,390,087 B1 | 7/2016 | Roux et al. | |
| 9,495,331 B2 | 11/2016 | Govrin et al. | |
| 9,772,993 B2 | 9/2017 | Braga et al. | |
| 9,830,315 B1 | 11/2017 | Xiao et al. | |
| 10,042,844 B2 | 8/2018 | Anand et al. | |
| 10,607,504 B1 | 3/2020 | Ramanarayanan et al. | |
| 2002/0032564 A1 | 3/2002 | Ehsani et al. | |
| 2002/0173955 A1* | 11/2002 | Reich | G10L 15/22 704/231 |
| 2003/0144055 A1 | 7/2003 | Guo et al. | |
| 2004/0083092 A1 | 4/2004 | Valles | |
| 2004/0193420 A1 | 9/2004 | Kennewick et al. | |
| 2004/0236575 A1 | 11/2004 | Goronzy et al. | |
| 2005/0080629 A1 | 4/2005 | Attwater et al. | |
| 2005/0105712 A1 | 5/2005 | Williams et al. | |
| 2005/0197828 A1 | 9/2005 | Mcconnell et al. | |
| 2005/0278180 A1 | 12/2005 | O'neill et al. | |
| 2006/0106595 A1 | 5/2006 | Brockett et al. | |
| 2006/0123358 A1 | 6/2006 | Lee et al. | |
| 2006/0136227 A1 | 6/2006 | Mizutani et al. | |
| 2007/0174043 A1 | 7/2007 | Makela | |
| 2007/0185702 A1 | 8/2007 | Harney et al. | |
| 2008/0167876 A1 | 7/2008 | Bakis et al. | |
| 2008/0184164 A1 | 7/2008 | Di fabbrizio et al. | |
| 2009/0327263 A1 | 12/2009 | Maghoul | |
| 2010/0217597 A1 | 8/2010 | Begeja et al. | |
| 2011/0015925 A1 | 1/2011 | Xu et al. | |
| 2011/0295591 A1 | 12/2011 | Fang et al. | |
| 2011/0301943 A1 | 12/2011 | Patch | |
| 2012/0081371 A1 | 4/2012 | Ozkaragoz et al. | |
| 2012/0265534 A1 | 10/2012 | Coorman et al. | |
| 2013/0080167 A1 | 3/2013 | Mozer | |
| 2013/0111348 A1 | 5/2013 | Gruber et al. | |
| 2013/0185074 A1 | 7/2013 | Gruber et al. | |
| 2013/0275138 A1 | 10/2013 | Gruber et al. | |
| 2013/0275899 A1 | 10/2013 | Schubert et al. | |
| 2014/0067375 A1 | 3/2014 | Wooters | |
| 2014/0142924 A1 | 5/2014 | Friedman | |
| 2014/0149112 A1 | 5/2014 | Kalinli-akbacak | |
| 2014/0180692 A1 | 6/2014 | Joshi et al. | |
| 2014/0278343 A1 | 9/2014 | Tran | |
| 2014/0316782 A1* | 10/2014 | Tzirkel-Hancock | G10L 15/06 704/244 |
| 2015/0032443 A1 | 1/2015 | Karov et al. | |
| 2015/0066479 A1 | 3/2015 | Pasupalak et al. | |
| 2015/0169758 A1 | 6/2015 | Assom et al. | |
| 2015/0364128 A1 | 12/2015 | Zhao et al. | |
| 2016/0034448 A1 | 2/2016 | Tran | |
| 2016/0048504 A1 | 2/2016 | Narayanan | |
| 2016/0062981 A1 | 3/2016 | Dogrultan et al. | |
| 2016/0078866 A1 | 3/2016 | Gelfenbeyn et al. | |
| 2016/0180853 A1* | 6/2016 | VanLund | G10L 17/22 704/275 |
| 2016/0188610 A1 | 6/2016 | Bhatia et al. | |
| 2016/0259767 A1 | 9/2016 | Gelfenbeyn et al. | |
| 2016/0260029 A1 | 9/2016 | Gelfenbeyn et al. | |
| 2016/0314791 A1 | 10/2016 | Wang et al. | |
| 2016/0322050 A1 | 11/2016 | Wang et al. | |
| 2016/0342702 A1 | 11/2016 | Barve et al. | |
| 2017/0148073 A1 | 5/2017 | Nomula et al. | |
| 2017/0228372 A1 | 8/2017 | Moreno et al. | |
| 2017/0300831 A1* | 10/2017 | Gelfenbeyn | G10L 15/1815 |
| 2017/0309149 A1* | 10/2017 | Kaura | G08B 3/00 |
| 2017/0316777 A1 | 11/2017 | Perez et al. | |
| 2017/0323636 A1 | 11/2017 | Xiao et al. | |
| 2017/0330077 A1 | 11/2017 | Williams et al. | |
| 2018/0061408 A1 | 3/2018 | Andreas et al. | |
| 2018/0114522 A1 | 4/2018 | Hall et al. | |
| 2018/0203833 A1 | 7/2018 | Liang et al. | |
| 2018/0246954 A1 | 8/2018 | Andreas et al. | |
| 2018/0261205 A1 | 9/2018 | Liang et al. | |
| 2018/0293483 A1 | 10/2018 | Abramson et al. | |
| 2018/0350349 A1 | 12/2018 | Liang et al. | |
| 2019/0066660 A1 | 2/2019 | Liang et al. | |
| 2019/0103092 A1 | 4/2019 | Rusak et al. | |
| 2020/0193970 A1 | 6/2020 | Liang et al. | |

FOREIGN PATENT DOCUMENTS

| | | |
|---|---|---|
| WO | 2006016308 A1 | 2/2006 |
| WO | 2006037219 A1 | 4/2006 |
| WO | 2014015267 A2 | 1/2014 |
| WO | 2016114922 A1 | 7/2016 |

OTHER PUBLICATIONS

"Final Office Action Issued in U.S. Appl. No. 15/804,093", dated Sep. 4, 2019, 18 Pages.

"Non Final Office Action Issued in U.S. Appl. No. 15/804,093", dated May 13, 2019, 15 Pages.

(56) References Cited

OTHER PUBLICATIONS

"Final Office Action Issued in U.S. Appl. No. 15/892,194", dated Oct. 10, 2019, 11 Pages.
"Non Final Office Action Issued in U.S. Appl. No. 15/892,194", dated Feb. 25, 2019, 12 Pages.
"Non Final Office Action Issued in U.S. Appl. No. 15/974,650", dated Dec. 26, 2019, 13 Pages.
Wang, et al., "Building a semantic parser overnight", In Proceedings of the Annual Meeting of the Association for Computational Linguistics, 2015, pp. 1332-1342.
"International Search Report & Written Opinion Issued in PCT Application No: PCT/US2018/019556", dated May 29,2018, 10 Pages.
"Non-Final Office Action Issued in U.S. Appl. No. 15/669,795", dated Jul. 11, 2018, 13 Pages.
"International Search Report Issued in PCT Application No. PCT/US2017/048384", dated Nov. 22, 2017, 6 Pages.
"International Search Report Issued in PCT Application No. PCT/US2017/058138", dated Jan. 5, 2018, 5 Pages.
"International Search Report & Written Opinion Issued in PCT Application No. PCT/US2017/060134", dated Jan. 29, 2018, 6 Pages.
"International Search Report Issued in PCT Application No. PCT/US2018/017465", dated May 2, 2018, 7 Pages.
"Non Final Office Action Issued in U.S. Appl. No. 15/904,125", dated Jul. 12, 2019, 15 Pages.
"Non Final Office Action Issued in U.S. Appl. No. 15/804,093", dated Feb. 4, 2020, 23 Pages.
"Supplementary Search Report Issued in European Application No. 18751475.7", dated Apr. 20, 2020, 11 Pages.
"Non Final Office Action Issued in U.S. Appl. No. 16/115,491", dated May 13, 2020, 15 Pages.
"Extended European Search Report Issued in European Patent Application No. 18756646.8", dated May 27, 2020, 8 Pages.
"Extended European Search Report Issued in European Patent Application No. 17867628.4", dated May 15, 2020, 9 Pages.
"Final Office Action Issued in U.S. Appl. No. 15/974,650", dated Jun. 9, 2020, 9 pages.
"Notice of Allowance Issued in U.S. Appl. No. 15/804,093", dated Jun. 18, 2020, 10 pages.

\* cited by examiner

RAPID DEPLOYMENT OF DIALOGUE SYSTEM

CROSS REFERENCE TO RELATED APPLICATIONS

The present application claims the priority benefit of U.S. Provisional Patent Application Ser. No. 62/533,096, filed on Jul. 16, 2017, titled "Rapid Deployment Dialogue System". The present application is also a continuation-in-part of U.S. patent application Ser. No. 15/974,650, filed on May 8, 2018, titled "Flexible and Expandable Dialogue System," which claims the priority benefit of U.S. Provisional Patent Application Ser. No. 62/503,248, filed on May 8, 2017, titled "Flexible and Expandable Dialogue System". U.S. patent application Ser. No. 15/974,650 is a continuation-in-part of U.S. patent application Ser. No. 15/904,125, filed Feb. 23, 2018, which claims priority to U.S. Provisional Patent Application Ser. No. 62/462,736, filed Feb. 23, 2017. The disclosures of each of which are hereby incorporated herein by reference for all purposes.

BACKGROUND

Automated dialogue systems are imperfect but typically improve over time as additional data is collected from real-world users. This creates a chicken-and-egg problem because the dialogue system should reach a high level of performance before real users will voluntarily make use of it, but this level of performance is most easily attained after collecting data from real users.

One approach for solving this problem is to generate data which is similar to real users in an automated fashion or by paying users to use the system in order to generate data. Unfortunately, both approaches produce very different kinds of data than real-world scenarios. Generated data only includes behaviors, language, and so on, that the author of the generator can imagine, which is usually much less varied than real-world use. Similarly, paid users have very different goals and usage patterns than real users (e.g. they are unlikely to exhibit frustration), and quickly fall into unrealistic habits and patterns. Either way, the quality of this data is not nearly as high as that from real users using the system. An improved dialogue system that is able to provide a high level of service with little initial data is desirable.

SUMMARY

The present technology, roughly described, rapidly deploys a dialogue system with a small amount of data to real world users while still allowing the users to experience a high level of performance. In some instances, this can be accomplished through human assistance incorporated into the dialogue system. When the dialogue system receives a request from a user, it attempts to handle it automatically using its current machine learning model. This model produces a ranked list of alternatives. Each alternative includes a list of actions to be taken, which include one or more end-user-visible actions (e.g. responding to the request) and/or internal actions which represent changes in the system's understanding of the conversation state. A previously-trained machine-learned confidence model decides whether to proceed with a top alternative or obtain human assistance to select an alternative. This human assistance may be provided by one or both of the human user participating in the dialogue session and other human users (e.g., voluntary and/or paid reviewers). Once one or more humans have responded, the system may provide a response to the request. As the system receives more data, the dialogue model is updated for improved performance, the confidence model less frequently determines human assistance is needed, and the system becomes more likely to be completely automatic.

Accordingly, a method for a dialogue system includes establishing a dialogue session between an application executing on a server and a remote machine. The dialogue session includes one or more utterances received from a user at the remote machine. An application on the server receives a computer-readable representation of an utterance by the user. The application operates a natural language processing machine to identify a request associated with the computer-readable representation of the utterance. The application operates a dialogue expansion machine to generate a plurality of alternative actions for responding to the request. The application operates a previously-trained machine learning confidence model to assess a confidence score for each alternative. If a highest confidence score for a top alternative does not satisfy a threshold, the plurality of alternatives including the top alternative are transmitted to a remote machine (which may be the same remote machine or a different remote machine) for review by a human reviewer. After the dialogue system and/or the human reviewer select an alternative, computer-readable instructions defining the selected alternative are executed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present technology, roughly described, rapidly deploys a dialogue system with a small amount of data to real world users while still allowing the users to experience a high level of performance. In some instances, this can be accomplished through human assistance incorporated into the dialogue system. When the dialogue system receives a request from a user, it attempts to handle it automatically using its current machine learning model. This model produces a ranked list of alternatives. Each alternative includes a list of actions to be taken, which include one or more end-user-visible actions (e.g. responding to the request) and/or internal actions which represent changes in the system's understanding of the conversation state. A previously-trained machine-learned confidence model decides whether to proceed with a top alternative or obtain human assistance to select an alternative. The human assistance may be provided by one or both of the human user participating in the dialogue session and other human users and/or human reviewers (e.g., voluntary and/or paid reviewers). Once one or more humans have responded, the system may provide a response to the request. As the system receives more data, the dialogue model is updated for improved performance, the confidence model less frequently determines human assistance is needed, and the system becomes more likely to be completely automatic (e.g., capable of automatically providing an appropriate response to numerous, diverse requests, without any human assistance).

The dialogue system improves the technology of automated computer assistants (and any other technologies that may incorporate a dialogue system for interacting with real world users), by enabling a "light touch" approach in which the dialogue system cooperates with users to complete tasks with minimal follow-up questions (e.g., no follow-up questions) and efficient processing. Furthermore, the dialogue system is able to robustly and usefully perform various assistive tasks based on dialogue with users, by selecting actions only when confident that the user's intent has been interpreted correctly. Accordingly, the dialogue system may minimize likelihood of errors such as incorrectly performing an action inconsistent with the user's intent. Furthermore, the dialogue system may cooperate with one or more humans to select a correct action when not sufficiently confident in the selection of an action, in order to perform the selected action to provide immediate assistance. The dialogue system may be trained based on the cooperative selection of actions, in order to improve a likelihood and/or confidence for selecting the correct action in a subsequent interaction. In this way, the system benefits from real world training scenarios after the system is deployed without providing unacceptable performance prior to the beneficial training from the real world scenarios being used to update the system.

Figure 1A:
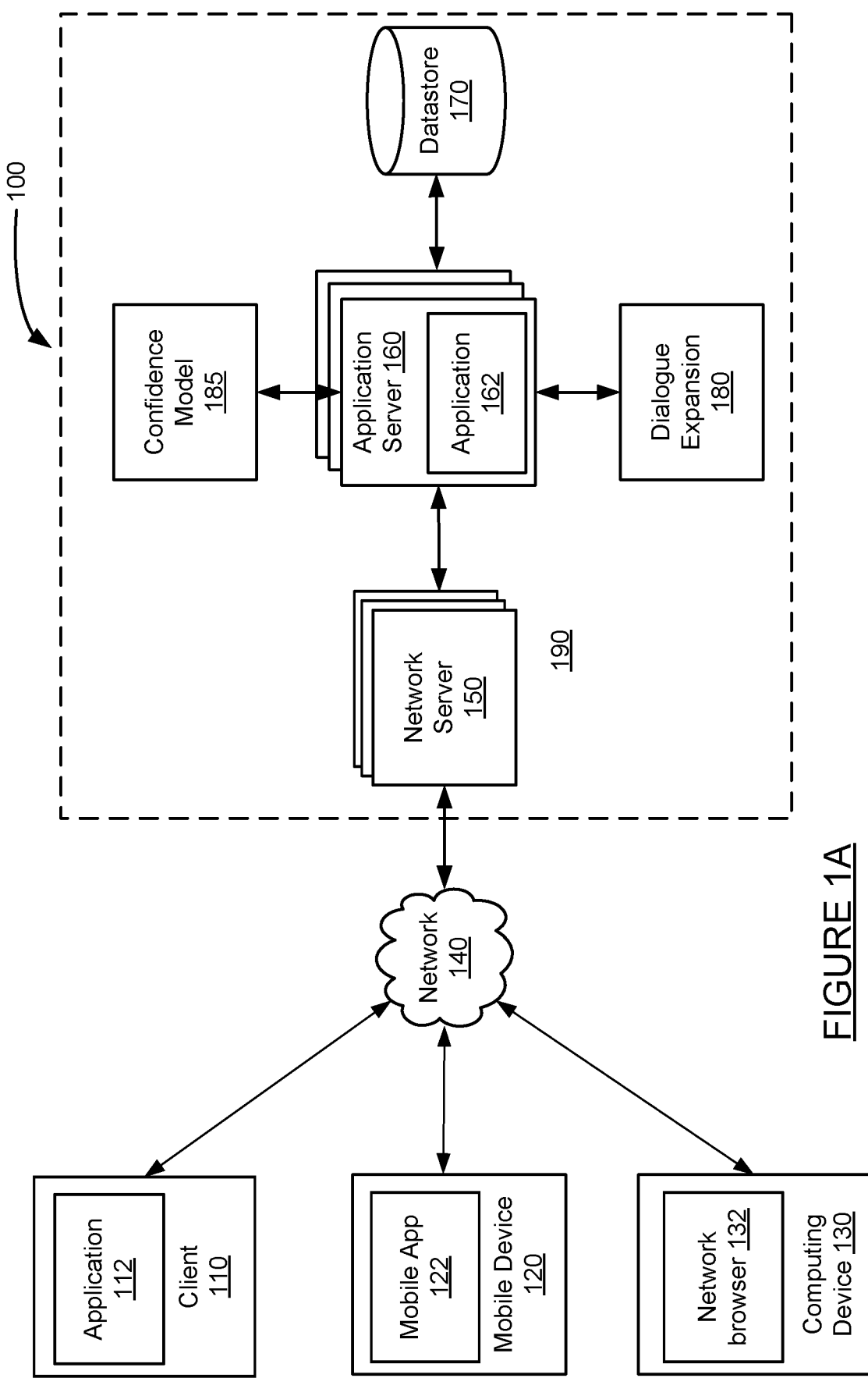
FIGS. 1A-1B are block diagrams of systems that implement dialogue expansion.

FIG. 1A is a block diagram of a system for providing a flexible and expandable dialogue system. System 100 of FIG. 1A includes client 110, mobile device 120, computing device 130, network 140, network server 150, application server 160, and data store 170. Client 110, mobile device 120, and computing device 130 each may include a communication subsystem configured to communicate with each other and/or with network server 150 over network 140. Network 140 may include a private network, public network, the Internet, and intranet, a WAN, a LAN, a cellular network, or some other network suitable for the transmission of data between computing devices of FIG. 1A.

Client 110 may instantiate application 112. Application 112 may provide an automated assistant, TTS functionality, automatic speech recognition, parsing, domain detection, and other functionality discussed herein. Application 112 may be implemented as one or more applications, objects, modules, or other software. Application 112 may communicate with application server 160 and data store 170 through the server architecture of FIG. 1A or directly (not illustrated in FIG. 1A) to access data.

Mobile device 120 may instantiate a mobile application 122. The mobile application may provide the same functionality described with respect to application 112. Mobile application 122 may be implemented as one or more applications, objects, modules, or other software, and may operate to provide services in conjunction with application server 160.

Computing device 130 may instantiate a network browser application 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser application 132 via network 140. The request may be initiated by the particular applications or browser applications. Network server 150 may process the request and data, transmit a response, or transmit the request and data or other content to application server 160.

Application server 160 may instantiate application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 may instantiate application 162, which may operate similarly to application 112 except implemented all or in part on application server 160.

Figure 1B:
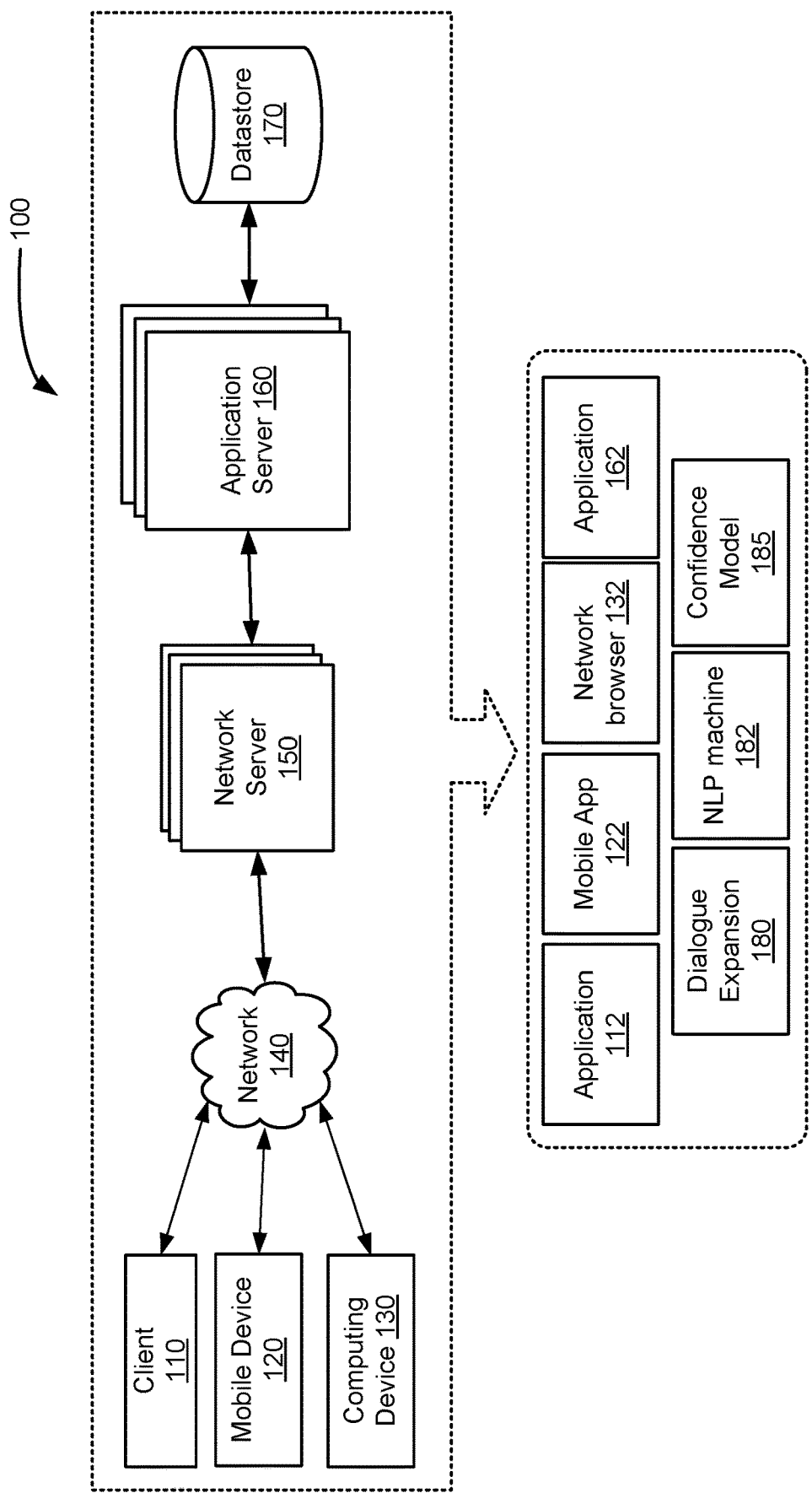

The computing devices of system 100, namely client 110, mobile device 120, computing device 130, network server 150, application server 160, and/or data store 170, may communicatively couple via network 140 and cooperate to instantiate any of the logic machines, models (e.g., machine-learning models) and/or applications described herein, as shown in FIG. 1B. Although not shown in FIG. 1B, each of the devices shown in system 100 may include one or more communication subsystems, logic subsystems and/or storage subsystems, as well as any other suitable subsystems and/or peripherals (e.g., input subsystems, display subsystems, etc.). Accordingly, any method or process described with regard to the machines, models, and/or applications may be performed by any suitable combination of logic subsystems, storage subsystems, and/or any other subsystems/peripherals of any subset of one or more of client 110, mobile device 120, computing device 130, network server 150, and/or application server 160. Machines, models, and/or applications may be described herein as being instantiated by system 100 when the machines, models, and/or applications are implemented by any suitable combination of the above-described components of system 100. In particular, the devices shown in FIGS. 1A and 1B may cooperate to instantiate one or more logic machines and/or models (e.g., machine-learning models), including any or all of NLP machine 182, dialogue expansion machine 180, and/or confidence model 185. Furthermore, the devices shown in FIGS. 1A and 1B may cooperate to instantiate one or more applications, including any or all of application 112, mobile application 122, network browser application 132, and/or application 162. In some examples, application 112, mobile application 122, network browser application 132, and/or application 162 may be implemented via common executable code (e.g., common source code and/or common machine code), and/or common runtime state/data/user preferences. In some examples, one or more of the applications may provide related functionality, such as cross-device access to a common user interface. Accordingly, although the present disclosure may describe functionality with regard to a particular application 112, mobile application 122, network browser application 132, and/or application 162, any of the applications may be implemented to include similar or equivalent functionality.

System 100 may instantiate a natural language processing (NLP) machine 182 configured to identify a request associated with a computer-readable representation of an utterance. NLP machine 182 may generally identify a request by matching the request to one or more intents and/or associated entities. An intent represents an action the user may wish to perform, which may include a question or task, e.g., making a reservation at a restaurant, calling a taxi, displaying a reminder at a later time, and/or answering a question. In general, requests made by the user may be associated with one or more intents (e.g., intent to receive an answer to a factual question, intent to receive assistance with performing a task, etc.) An entity may include a noun or a particular named entity (e.g., the user's boss Alice) or a placeholder representing a particular type of entity, e.g., a person, an animal, a coworker, a place, a time of day, a date, and/or an organization. NLP machine 182 may be configured to recognize a placeholder entity when NLP machine 182 is unable to recognize a particular noun or named entity, e.g., when a user utterance includes ambiguous pronouns or referents or when NLP machine 182 is otherwise unable to understand a particular word or phrase (e.g., due to interruptions to speech audio and/or unclear speech).

NLP machine 182 may be configured to parse an utterance by the user in order to recognize intents and/or entities defined by the utterance. An utterance is any user input, e.g., a sentence or sentence fragment, which may or may not be well-formed (e.g., with regard to grammar, word usage, pronunciation and/or spelling).

NLP machine 182 may be configured to utilize any suitable natural language processing techniques. For example, NLP machine 182 may include a dependency parser and/or a constituency parser configured to recognize a grammatical structure of an utterance. NLP machine 182 may additionally be configured to recognize key-value pairs representing semantic contents of an utterance, e.g., a type of entity of an utterance paired with a name of a specific entity of that type. In some examples, components of NLP machine 182 (e.g., the dependency parser) may utilize one or more machine-learning technologies. Non-limiting examples of such machine-learning technologies can include Feedforward Networks, Recurrent Neural Networks (RNN), Long Short-term Memory (LSTM), Convolutional Neural Networks, Support-vector Machines (SVM), Generative-Adversarial Networks (GAN), Variational Autoencoders, Q-Learning, Decision Trees, Conditional Random Fields (CRF), hidden Markov models, etc. In some examples, NLP machine 182 may be implemented as one or more graphical models (e.g., CRF) with nodes in the graphical model(s) representing possible intents and/or entities which may be associated with utterances. Accordingly, edges in the graphical models may represent transition functions between different possible intents/entities, where a probability of transitioning to a particular intent and/or entity is determined based on the utterance, intents/entities recognized so far, and any other relevant features of the user interacting with the dialogue system (e.g., user preferences). In some examples, transition functions in a graphical model may be based on further machine-learning technologies, e.g., a neural network configured to assess a confidence associated with each possible transition. In some examples, matching an utterance to one or more intents and/or entities may be based on traversing and/or randomly sampling the graphical model (e.g., via a Markov chain and/or random walk algorithm(s)), according to the transition functions.

In some examples, NLP machine 182 may be configured to recognize a predefined set of intents and/or entities. Alternately or additionally, NLP machine 182 may be trained based on example utterances. In some examples, NLP machine 182 may be configured to recognize a new intent and/or entity by supplying NLP machine 182 with a number of labelled examples, where a labelled example includes a new intent to be recognized along with an exemplary utterance annotated to denote relevant entities. NLP machine 182 may be trained on a relatively small number of training examples (e.g., tens of training examples) or on any larger number of training examples (e.g., hundreds, thousands, millions, or more). NLP machine 182 may be trained for the specific purpose of parsing utterances in the context of a dialogue system according to the present disclosure, so that the accuracy and/or performance of NLP machine 182 is optimized for the dialogue system. For example, when NLP machine 182 is based on one or more neural networks, training NLP machine 182 may include training the one or more neural networks via stochastic gradient descent using the backpropagation algorithm, with regard to an objective function measuring relevance and/or user satisfaction with alternative actions performed by the dialogue system responsive to user requests. Alternately or additionally, NLP machine 182 may be trained via reinforcement learning, based on reinforcement signals supplied by a human (e.g., reinforcement signals indicating user satisfaction or dissatisfaction).

In some cases, NLP machine 182 may be configured to recognize a particular human language, e.g., English. Alternately or additionally, NLP machine 182 may be configured to recognize a plurality of different human languages. When NLP machine 182 is configured to recognize a plurality of different human languages, NLP machine 182 may be able to process utterances including words in multiple different languages.

System 100 may instantiate a dialogue expansion machine 180 configured to generate a plurality of alternatives for responding to a request (e.g., based on matching the request with one or more actions that may satisfy the request). Dialogue expansion machine 180 may be implemented by any suitable combination of machine learning (ML), artificial intelligence (AI), and/or natural language processing (NLP) technologies. Dialogue expansion machine 180 may be implemented via a classifier system configured to receive a computer-readable description of one or more intents and/or entities associated with a request, and to select a corresponding action of a plurality of alternative actions. In some examples, selecting the corresponding action of a plurality of alternative actions may be based on assessing, for each candidate action of the plurality of alternative actions, a confidence score for the relevance of the action to the intent and/or entities associated with the request. In some examples, dialogue expansion machine 180 may cooperate with and/or incorporate confidence model 185 for assessing such confidence scores. In some examples, dialogue expansion machine 180 may be a neural network configured to assess the confidence scores. Dialogue expansion machine 180 may be trained in any suitable fashion (e.g., supervised, unsupervised, and/or reinforcement learning). In some examples, dialogue expansion machine 180 may be trained based on a relatively small number of labelled examples (e.g., tens of labelled examples) or based on any larger number of labelled intent/action examples. A labelled example for training dialogue expansion machine 180 may include an intent paired with an appropriate action which is relevant to the intent (e.g., an action which would satisfy the intent). Dialogue expansion machine 180 may be trained with regard to an objective function measuring accuracy and/or performance of dialogue expansion machine 180 (e.g., an objective function measuring a tendency to select appropriate alternative actions based on user intents, when given labelled intent/action examples in supervised training). Alternately or additionally, dialogue expansion machine 180 may be trained via unsupervised and/or reinforcement learning (e.g., via reinforcement learning based on reinforcement signals supplied by a user to indicate satisfaction and/or dissatisfaction with actions selected by dialogue expansion machine 180).

Alternately or additionally, dialogue expansion machine 180 may be trained along with NLP machine 182 in an "end-to-end" fashion, in which both dialogue expansion machine 180 and NLP machine 182 are trained jointly based on labelled utterance/action examples, so that a labelled example for jointly training the machines includes an example utterance and an example action which is relevant to the utterance (e.g., an action which would satisfy a request featured in the utterance). For example, when dialogue expansion machine 180 and/or NLP machine 182 are based on one or more neural networks, the machines may be trained end-to-end based on an objective function and/or reinforcement signals, by propagating error indicated by the objective function and/or reinforcement signals through all of the neural networks of dialogue expansion machine 180 and NLP machine 182, so as to adjust relevant parameters of dialogue expansion machine 180 and NLP machine 182 with regard to the joint task of selecting an appropriate action given a user utterance. Similarly, when dialogue expansion machine 180 is integrated with or operated in cooperation with confidence model 185, dialogue expansion machine 180 and confidence model 185 may be trained end-to-end to continually improve the joint performance of the machines.

Returning to FIG. 1A, block 190 includes network server 150, application server 160, data store 170, the instantiated dialogue expansion machine 180, and the instantiated confidence model 185. Dialogue expansion machine 180 may communicatively couple with application 162, and/or with other modules, programs, and machines described herein (e.g., modules, programs, and machines shown in FIG. 1A and/or FIG. 1B). The dialogue expansion machine may be used to expand dialogue without requiring significant engineering or developer resources and/or time. In some examples, the dialogue expansion machine may be trained to continually improve performance (e.g., with regard to an objective function measuring accuracy, relevance, user satisfaction, and/or any other suitable metrics of interpretation of user requests), even in absence of any engineering or developer resources and/or time.

Dialogue expansion machine 180 may generate one or more alternative actions (referred to herein as "alternatives") for responding to a user request (e.g., to perform a task to assist the user based on the request). An alternative may be defined in any suitable manner, e.g., by commands, macros, and/or any other instructions to perform the alternative action. In some examples, an alternative may be defined by computer-readable instructions to perform an assistive task associated with the alternative. Alternatives may each be associated with one or more of various assistive tasks which may be implemented by computer-readable instructions to transform the state of one or more computer systems in any suitable manner. Non-limiting examples of assistive tasks that may be associated with an alternative include causing devices of computing system 100 (e.g., client 110, mobile device 120, computing device 130, network server 150, and/or application server 160) to execute any suitable functions. For example, these devices may execute functions to transform data, display information, output sound(s), actuate peripheral electronic devices, communicatively couple to one or more other computing devices to invoke application programming interfaces provided by the one or more other computing devices, etc. Dialogue expansion machine 180 is discussed in more detail with respect to FIG. 2.

Confidence model 185 may generate confidence scores for each alternative of the one or more alternatives generated by the application in response to a user request during a dialogue. Confidence model 185 may be any suitable confidence model for assessing the confidence scores, e.g., a statistical model and/or a previously-trained machine learning confidence model. The confidence scores can be used to determine whether one or more actions associated with each alternative shall be performed automatically or if additional processing should be performed to analyze the alternatives. For example, additional processing may be performed if the top confidence score for an alternative having a highest confidence score is lower than a threshold (e.g., indicating a possibility that none of the alternatives is particularly suitable for satisfying the request). The additional processing may include analyzing the dialogue, user request, and other data, as well as optionally receiving and processing input from a human user that reviews the generated one or more alternatives (e.g., a human reviewer). Confidence model 185 may be trained to classify a possible action as being relevant or not relevant to a given user utterance and/or intent received from NLP machine 182 and/or dialogue expansion machine 180, in order to generate a confidence score for the classification. Alternately or additionally, confidence model 185 may be configured to approximate a statistical distribution of possible actions given the user utterance and/or intent, in order to estimate a confidence score based on a likelihood of a candidate action given the user utterance and/or intent, according to the approximated distribution. Alternately or additionally, confidence model 185 may generate a confidence score for a candidate action given a user utterance and/or intent in any other fashion. Confidence model 185 may be implemented via any suitable combination of state-of-the-art and/or future statistical, ML, AI, and/or NLP techniques. Confidence model 185 is discussed in more detail with respect to FIG. 6.

Figure 2:
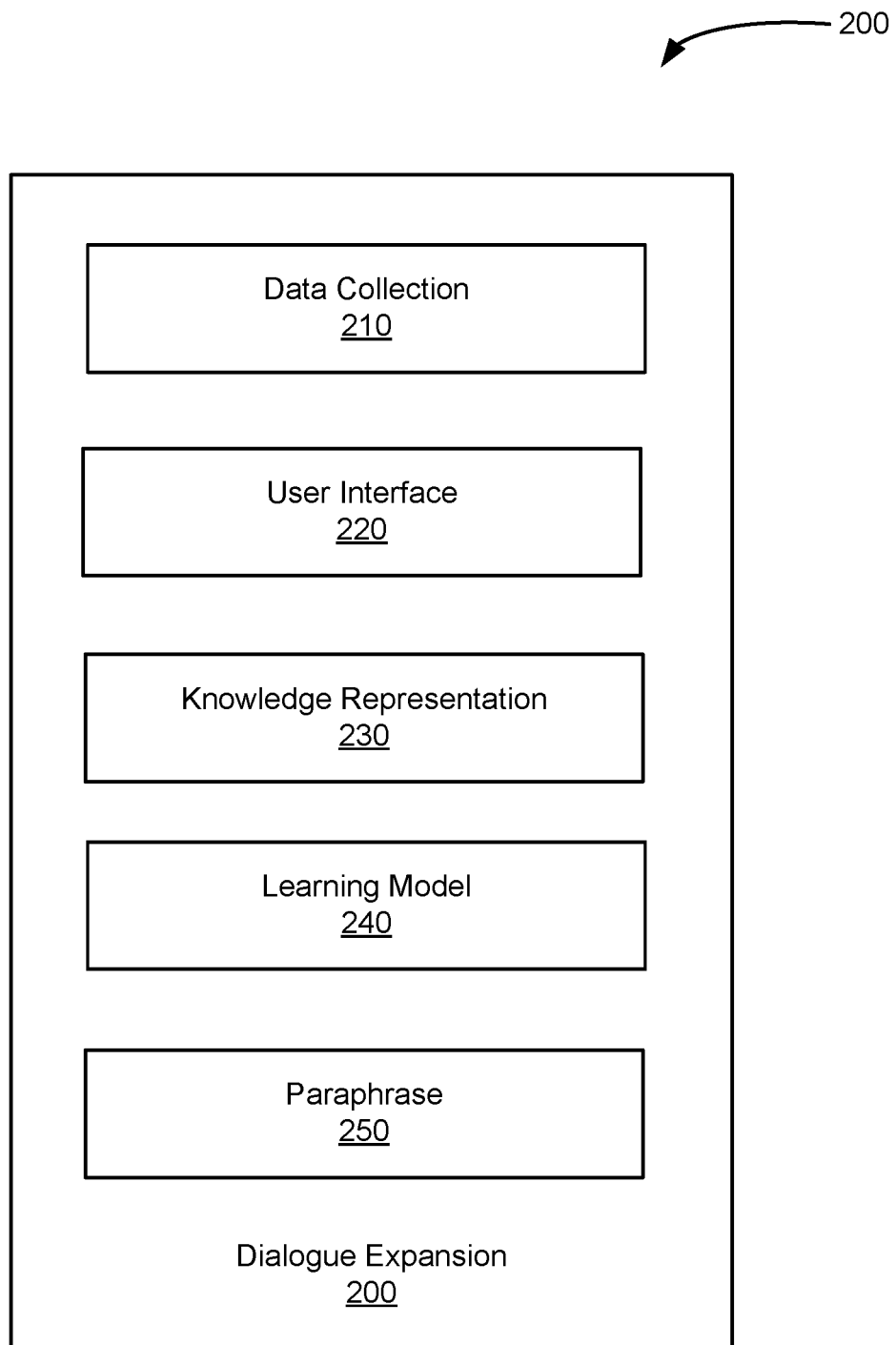
FIG. 2 is a block diagram of an exemplary dialogue expansion machine.

FIG. 2 is a block diagram of an exemplary dialogue expansion machine. The dialogue expansion machine 200 of FIG. 2 provides more details for dialogue expansion application 180 of FIGS. 1A and 1B. Dialogue expansion machine 200 of FIG. 2 includes modules of data collection 210, user interface 220, knowledge representation 230, learning model 240, and paraphrase machine 250. Each module of dialogue expansion machine 200 may implement a component of the expandable dialogue system of the present technology.

Data collection module 210 may handle data collection by the expandable dialog system. The data collection may include collecting phrases in a given domain from annotators, collecting dialogue using a subset of phrases or something similar to the phrases, receiving annotations, and receiving and managing paraphrase annotated dialogues.

The user interface module 220 can provide and update a series of interfaces for receiving utterances, input, and other information, creating associations, and configuring actions, thereby allowing non-experts to create dialogues in a simple language. In some instances, a user may provide an utterance, select one or more actions, provide input, set forth associations, and perform other operations through user interface.

Knowledge representation 230 may define a small set of primitives and a simple language that allows for computing a wide range of results. An exemplary knowledge representation module is discussed with respect to FIG. 3.

Learning model 240 can learn from this type of supervision to generalize to new dialogues. An exemplary learning model is discussed with respect to FIG. 3.

Below are a few example actions discussed herein to provide examples of the types of things which exist in the system. Each entry is of the form: action_name(input_1: input_type_1, . . . , input_n: input_type_n): output_type—description of the action:

create_flight_search( ): FlightSearch—Creates a new flight search for a round trip flight. This encapsulates the parameters for the search to be executed, not the results of the search.

to_entities(text: String): List—Resolves the provided text to a List of entities. The result is a heterogenous List. e.g. to_entities('Georgia') may resolve to a List containing both the state and country of Georgia.

get_airports(city: City): List—Finds the airports for a city. The result is a List of Airports.

get_airport_code(airport: Airport): AirportCode—Looks up the AirportCode for an Airport.

Paraphrase machine 250 may receive a text output or input and generate different words having a similar or same meaning of the words. The text output or input can be easier processed by a dialogue system or expandable dialogue system.

In addition to the actions associates with the flights domain, there are also many actions which are shared across domains and are common to achieving complex tasks. These include things such as: arithmetic operators, logical operators, list sort, list filter, list subset, list map and extract abstract path. There are also domains which are common to many applications which have shared functions such as monetary and date operations.

Though the dialogue expansion machine 200 is illustrated with five modules 210-250, more or fewer modules may be included, included nested or sub-modules. Further, though the modules are described as operating to provide or construct the dialog expansion, other functionality described herein may also be performed by the modules. Additionally, all or part of the dialog expansion may be located on a single server or distributed over several servers and/or user devices.

Figure 3:
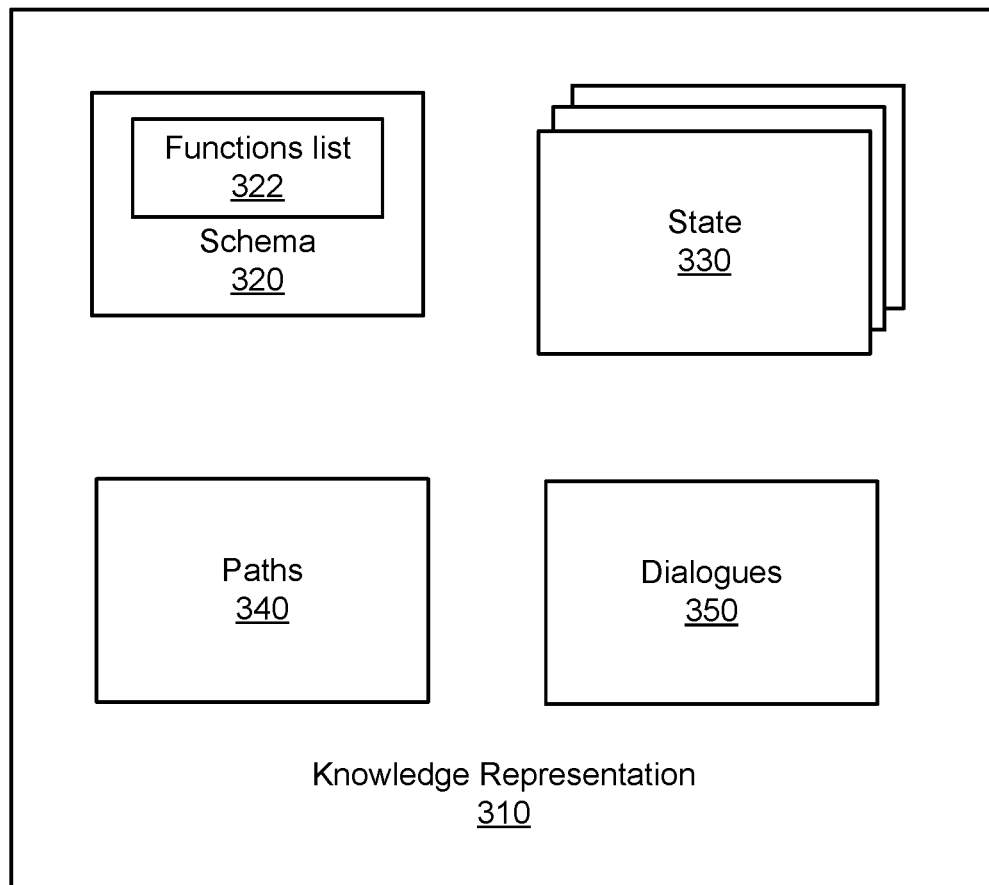
FIG. 3 is a block diagram of an exemplary knowledge representation module.

FIG. 3 is a block diagram of an exemplary knowledge representation 310. Knowledge representation 310 may take the form of a collection of one or more functional predicates, as shown here. Alternately or additionally, knowledge representation 310 may be based on any suitable combination of state-of-the-art and/or future machine learning (ML), artificial intelligence (AI), NLP, and/or knowledge representation techniques, e.g., graphical models. For example, knowledge representation 310 may take the form of a graphical model including nodes/edges representing the various entities, intents, and/or actions that may be recognized by a dialogue system. In some examples, the graphical model may be represented as a collection of edges corresponding to functional predicates as shown and described below, annotated with statistical and/or confidence values. Accordingly, the graphical model may be traversed and/or analyzed based on the functional predicates and the confidence values. For example, the graphical value may be a conditional-random field (CRF) and/or an artificial intelligence (AI) knowledge base. The knowledge representation of FIG. 3 provides more detail of module 230 of FIG. 2. The knowledge representation module includes schema, state data, path, and dialogue data.

Schema 320 can include a list of functions, where each function can include a type signature (tuple of input types and an output type). The functions are primitives used to produce behaviors by a dialogue system. Examples of functions and type signatures include:

get_country: City→Country;
perform_flight_search: FlightSearch→List; and
concat: List, List→List.

A state 330 is a (list) value, which is either a primitive value such as an integer or a structured value. A structured value can contain an ordered list of fields (name, value) pairs. In some instances, this is used to represent dictionaries (with ordered keys) as well as lists (with null keys). Each state represents a scratchpad that the administrator and automated agent use to collaboratively construct the common ground and the results of the automated agent's actions.

A path 340 is a reference to a particular part of the state (e.g., when the state is implemented as a directory structure where the contents are ordered). Formally, a raw path can be a sequence of indices, such as [0]. [0]. [1]. When given a state, a path can be rendered by showing types at the top level and field names, such as for example as [0:FlightSearch].parts.[1].

A dialogue includes a sequence of turns, where each turn includes who is talking (e.g., an automated agent, a human user, and/or an administrator), an utterance, and a sequence of actions. An utterance may be divided into a sequence of tokens and a set of paraphrases. For example, from the utterance "I'd like to fly to Boston," a sequence of actions may be create_flight_search( ), BOS:AirportCode, and [0:FlightSearch].parts. [0].destinations+=_ (e.g., where the underscore ('_') represents an unknown portion of an action to be filled in based on information in the dialogue context, for example, to be filled in with BOS:AirportCode). Each action takes a state (list of values) and produces another value. Actions may be primitive actions or call actions.

A primitive action (type, contents) adds the value contents with given type (e.g., string, date) to the end of the state (e.g., BOS:AirportCode). A call action (function, in_paths, out_path, append, out_field, condition_path), to a first order approximation, extracts the values sitting at in_paths, passes them as inputs into the function and returns the value.

There are several additional complexities that can be implemented by knowledge module 310. In some instances, if out_path is non-empty, then the present system can take the value at the first element of out_path, and return the version of this that has out_path inside it updated. For example, for [0: FlightSearch].parts[0].latest_departure_time=get_time([1:Datetime]), the present system would take the FlightSearch object, set the latest_departure_time field and then return the object. The present system can maintain immutability (e.g., when working with a modified version of an object, an immutable copy of the object may be maintained so as to preserve the original version of the object).

If append is true, then the output of the function is appended for example [0:FlightSearch].parts. [0].departure_dates+=[2:Datetime].

In some instances, the present technology appends not to a list but a structured field, in which case out_field should be filled too.

In some instances, paths can contain wildcards in them, in which the action is applied on all paths that match these. For example, "[0:FlightSearch].parts.*.permitted_airlines+=[4:AirlineCode]" performs the action for all parts of the search, filling in all possible sub-paths for the asterisk ("*") wildcard. In some instances, terminology may be used that lets the base nodes be the ones matched by the lowest node that contains all the wildcards of out_path.

If condition_path is set, then the present technology can get a Path p from this path, and then perform the action on all base nodes such that following p from the base node leads to a true Boolean value.

In summary, the present technology may be implemented, at least in part, using a programming language which may be evaluated based on an register machine with arbitrarily many registers (e.g., an infinite register machine) where each action produces a new value, and any value can be used for later computation. Each action can perform a 'foreach' and an 'if' over base nodes.

Figure 4:
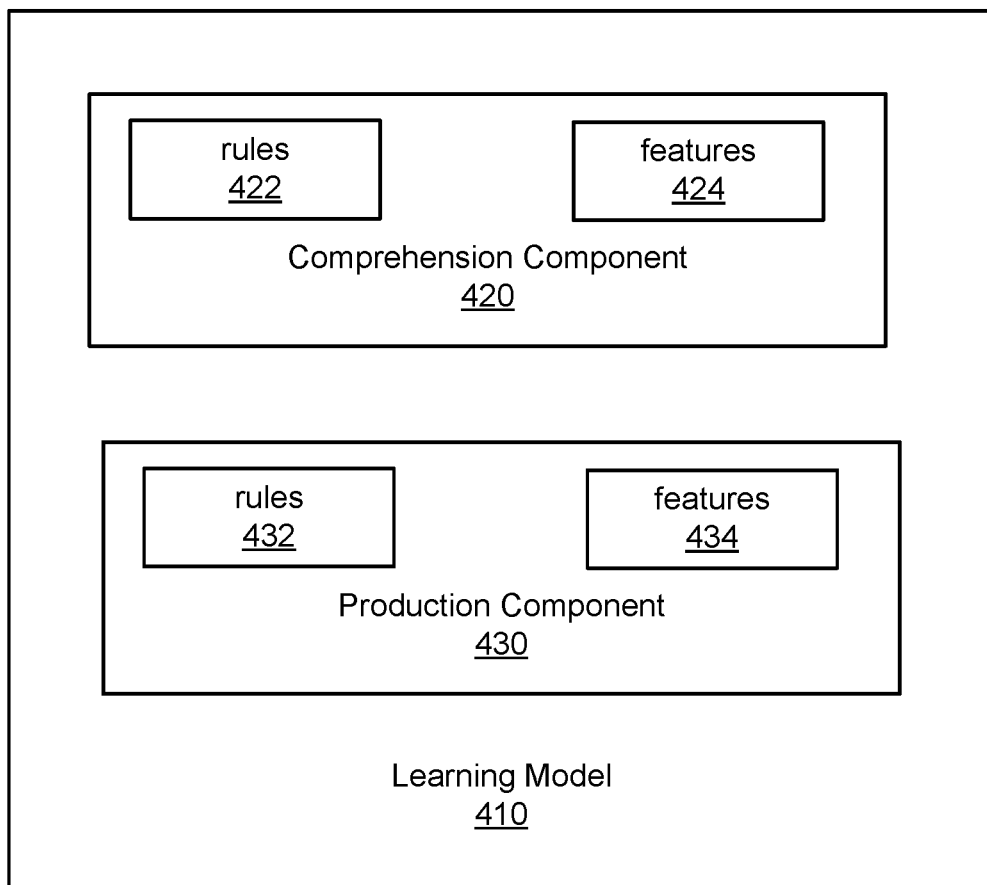
FIG. 4 is a block diagram of an exemplary learning model.

FIG. 4 is a block diagram of an exemplary learning model. The learning model 410 provides more detail for module 240 of FIG. 2. The learning model includes comprehension component 420 and production component 430.

The comprehension component converts context and a user utterance to a sequence of actions. The Production component converts context to a sequence of actions and an automated agent utterance. Each comprehension and production component can have rules and features a structural part (set of rules) and a soft part (set of features). The rules may be formulated to have relatively high recall (e.g., a relatively high rate of true-positive matching of an action given matching context, and/or a relatively low rate of false-negative failure to match an action given matching context). Alternatively or additionally, rules may be formulated to have relatively high accuracy, precision, area under receiver-operator-curve, and/or any other suitable metric of matching action(s) to context(s). In some instances, the present technology can rely on a statistical model to rank the possible outputs. The comprehension rules can map sequences of tokens and categories to a sequence of actions. For example, an utterance fitting the pattern "leaving before $Date($1)" may be mapped to data specifying an action such as [$1; FlightSearch[-1].parts.[0].latest_departure_time, Datetime[-1]). The production rules can map a pattern on the context to a sequence of actions and the natural language. For example, an utterance fitting the pattern "FlightSearch[-1].parts.[0].destination=null" may be mapped to "Where are you going?" Features, in some instances, can be simple and match various paths. Examples of features include:

Phrase _____ was mentioned in the last utterance

The value at path _____ is _____

Actions in turn _____ wrote to path _____

Figure 5:
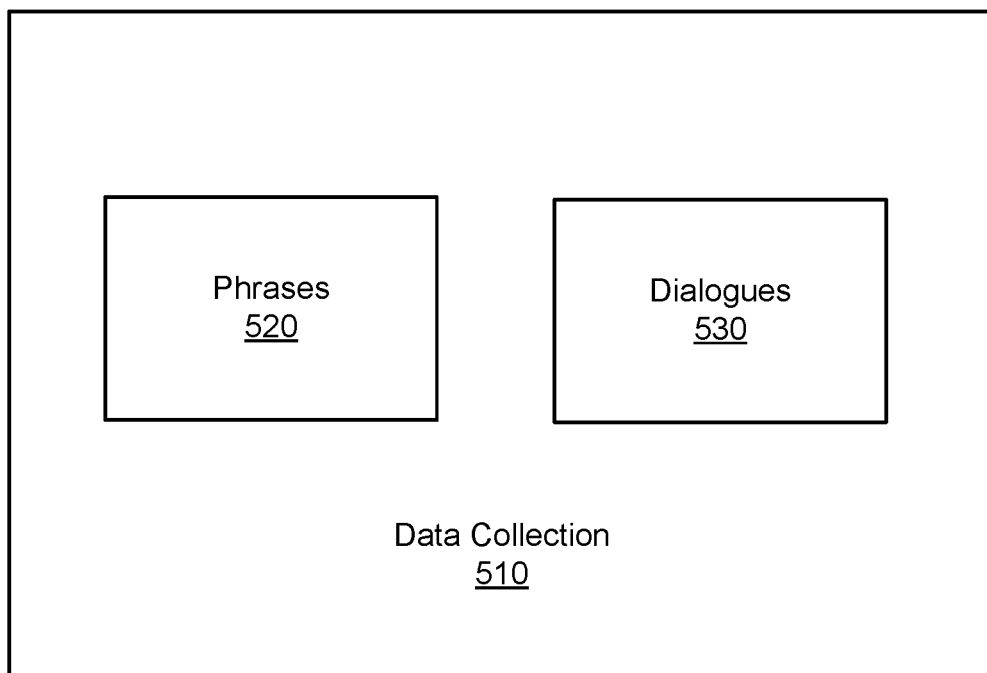
FIG. 5 is a block diagram of an exemplary data collection model.

FIG. 5 is a block diagram of an exemplary data collection model. Data collection 510 includes phrases 520 dialogues 530. The data collection module may implement a multi-tiered approach for data collection. In some instances, data collection module 510 may collect phrases and words of interest associated with a given domain, such as redeye, latest flight, no stops, layover, and other content associated with booking a flight. Data collection 510 may also construct dialogues from a subset of the phrases, where the dialogues use the phrases or something very similar to it the dialogues can be annotated with actions data collection module 510 may also provide paraphrase for annotated dialogues. The paraphrasing may be done given a bearing amount of context for the current dialogue.

In some instances, human users and/or human reviewers can be used to perform certain tasks in collaboration with the present system. In some instances, the users may be considered teachers. In this instance, they may be three levels of teachers for three types of tasks: paraphrasing, dialogue sketchers, and dialog programmers. Paraphrasers may be selected (e.g., out of a pool of candidates) based on relevant skills and or expertise, e.g., detail-oriented personality and/or fluency in the language of the dialogues (e.g., English, for a dialogue system for English speakers). Paraphrasers may be selected based on completing a test in which the paraphraser writes examples of paraphrases and judges whether two sentences are paraphrases. Paraphrasers may be asked to carefully distinguish between similar meaning and actual paraphrasing, e.g., correctly recognizing that the phrases "Sunday" and "Weekend", while related, are not synonymous and are not appropriate paraphrases of each other.

Dialogue sketchers can include people that may be both qualified as a customer service representative and able to simulate random things customers might do. The test may be to ask them to brainstorm different things a customer might do (to test their creativity in coming up with scenarios). The dialogues sketchers may ask them to respond as a customer service representative, and make sure that the response is professional and detail-oriented. These teachers could also be divided into user-side and automated-agent-side.

Dialogue programmers may be selected (e.g., out of a pool of candidate dialogue programmers) by administering a test to estimate capability of expressing a high-level intent in terms of primitive actions. For example, the test may ask a dialogue programmer to write down steps to complete a particular task, such as "compute the date of the Monday in the last week of May." In some cases, dialogue programmers may be selected based on any suitable relevant talents and/or expertise, e.g., personality characteristics such as thorough-mindedness, and/or a programming background. In some examples, a dialogue programmer may be asked to look at a sequence of steps and determine whether the sequence of steps produces a specified result (e.g., computes a specified value). In some examples, a human user and/or human reviewer may act as a dialogue sketcher and/or a dialogue programmer.

Figure 6:
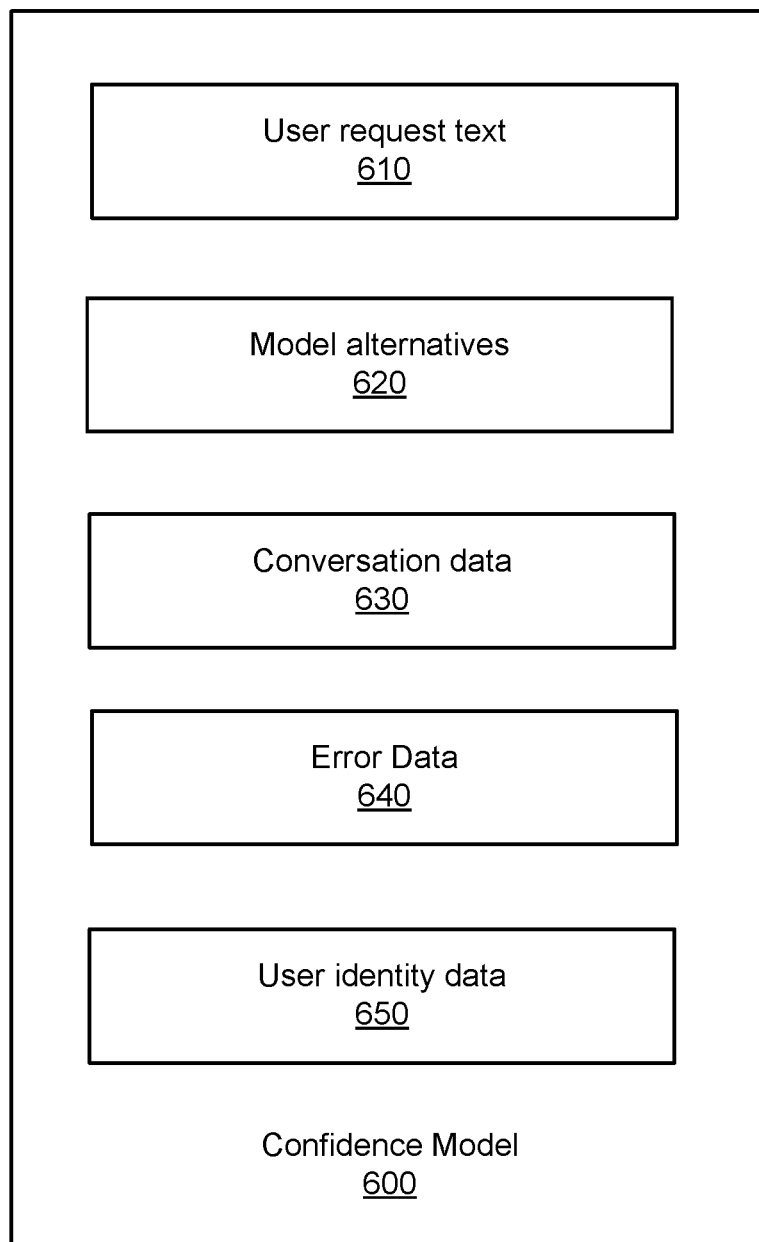
FIG. 6 is a block diagram of an exemplary confidence model.

FIG. 6 is a block diagram of an exemplary previously-trained machine learning confidence model. Confidence model 600 assesses a confidence value for the selection of an alternative, based on dialogue context including user request text 610, model alternatives 620, conversation data 630, error data 640, and user identity data 650. Confidence model 600 may access the data 610-650 to determine a confidence score for each of one or more alternatives produced by a dialogue application 162 in response to a user utterance (e.g., a user request). User request text 610 may include the text (or text equivalent from an audio input) received from a user by the dialogue system. Model alternatives may include information for alternatives generated as candidates for responses to the user request. Each alternative may include a root function or action and optionally additional actions to perform in response, synchronously or asynchronously, in response to the user request.

Conversation data may include a history of a conversation or dialogue, including past utterances, state information, and other data, between the user and the dialogue application. Error data may include errors that have been encountered based on previous selected alternatives for previous requests. User identity data may specify information about a user, such as for example whether the user is a first-time user of the dialogue application, whether the user pays for the service, and other information that may influence whether what level of service to provide the user.

The present dialogue system may be initially deployed based on a small amount of training data while still allowing real world users to experience a high level of performance. This is accomplished through human assistance incorporated into the dialogue system. When the dialogue system receives a request from a user, it attempts to handle it automatically using its current machine learning model. This model produces a ranked list of alternatives. Each alternative includes a list of actions to be taken, which include both end-user-visible actions (e.g. responding to the request) as well as internal actions which represent changes in the system's understanding of the conversation state. Exemplary actions are described in more detail in U.S. provisional patent application No. 62/462,736, titled "Expandable Dialogue System," filed Feb. 23, 2017, and U.S. provisional patent application No. 62/503,248, titled "Flexible and Expandable Dialogue System, filed May 8, 2017, the disclosures of which are incorporated herein by reference.

A separate machine-learned confidence model then considers various factors to decide whether to proceed with the top alternative or request human assistance. For example, the machine-learned confidence model might consider the following factors:
  the text of the user request
  the possible alternatives offered by the automated model
  textual clues through the conversation and how they fit various language models
  similarity to previous errors
  the user's identity (e.g. paying subscribers or new users might be more likely to be routed to a human)
  a random factor (e.g. a random percentage of all requests are routed to humans to ensure the confidence model is performing well)

Initially this confidence model can be tuned very conservatively, such that it signals uncertainty for anything which is even slightly unusual. As data is collected and the dialogue model improves, the confidence model can be tuned as needed to achieve a trade-off between error rate and human effort.

When the confidence model is uncertain, one of a group of human users and/or human reviewers (e.g., voluntary and/or paid reviewers) may be presented, through a computing device associated with each human, the state of the conversation leading up to the user request, their request, and the possible alternative actions. The human users and/or human reviewers may then provide input, such as for example:
  Approve the top alternative (indicating the automated agent was correct)
  Approve a non-top alternative
  Edit the actions of one of the alternatives (e.g. changing wording slightly, correcting the understanding of a particular word, etc.)
  Craft a set of new actions from scratch In some examples, the alternatives may be provided to a plurality of human reviewers, and a final selected alternative may be the alternative that was most often selected by the plurality of human reviewers (e.g., democratic selection of the final selected alternative by the plurality of human reviewers).

After the human reviewer(s) intervene, the system sends any response to the end user, and the process repeats. Critically, the actions the human takes usually leaves the conversation in a state where the system can take over again in an automated fashion. That is, the actions the humans craft are just like actions the automated agent might have taken had it been better trained. This requires the actions and conversation state representation to be extremely flexible but still quick to author, since the real end-user is waiting while the human reviewer is authoring a response.

Because this process may involve some time to obtain responses from one or more human reviewers, various mechanisms to alert the end-user to a longer-than-usual waiting period might be deployed. Examples of such mechanisms may include having the automated agent show a progress spinner, or display messages such as "hang on, let me check" while the human is authoring new actions. The human reviewers might also choose to send a response immediately and then author the appropriate actions just afterwards, so the end-user can decide what to do next while the actions are being authored.

The choices made by the humans are then used to train better confidence models and dialogue models for future versions of the system. Online learning could be used to allow immediate improvement based on the human actions. Multiple humans could be asked to review a single request to assess reliability of the human annotators and reduce error rate (e.g. if three humans are asked to review a request and two agree, the review contributed by the multiple humans may be utilized with higher confidence). Additionally, the present system may rate annotators using this data as well.

The approach of the present system stands in contrast to the approach taken by many existing systems, which is to allow the automated agent to always act out its top choice and have humans review the data afterwards and correct it. To allow an automated agent to always act out a top choice in a kind of post-hoc review has various downsides:
  First, as noted above, the end-user experience suffers since the automated system will have a relatively-high error rate, and so the users will be less likely to use the system in the future (reducing the amount of data collected).
  Second, even if users continue to use the system, they will rapidly figure out what doesn't work consistently and stop trying those things. (Or, even worse, they will develop incorrect beliefs about what does and does not work based on a couple examples.) This skews the distribution of the collected data to those things which already work, making the data less useful for improving the system.
  Finally, as the number of turns in a dialogue increases, the complexity of the interaction also increases. If an error occurs early in a dialogue and is uncorrectable, it is impossible to know post-hoc what the user would have done later on. This means the data collected will only include early (easier) interactions since the chance of a system making an error at some point during a long interaction increases dramatically with the length of the dialogue.

Another approach commonly used by other systems is to have entirely human-driven interactions and use those for training data. This approach also has downsides:
  Human-driven interactions may be more expensive since humans are required for every interaction.

Many of the most complex dialogue phenomena arise during periods of confusion, ambiguity or partial error. With a pure human-human dialogue, the kinds of errors and confusion are very different than automated dialogues. The approach proposed above will naturally include some automated errors and resulting recovery dialogues, which you would otherwise not capture in human-human dialogues.

Humans are unconstrained by the limitations inherent in any automated system and so it is very likely that complete a human-human dialogue will at some point go so far outside of a system's capacity as to be difficult to learn from. The approach described herein keeps the dialogue used for performing assistive actions and training within system capacity.

Figure 7:
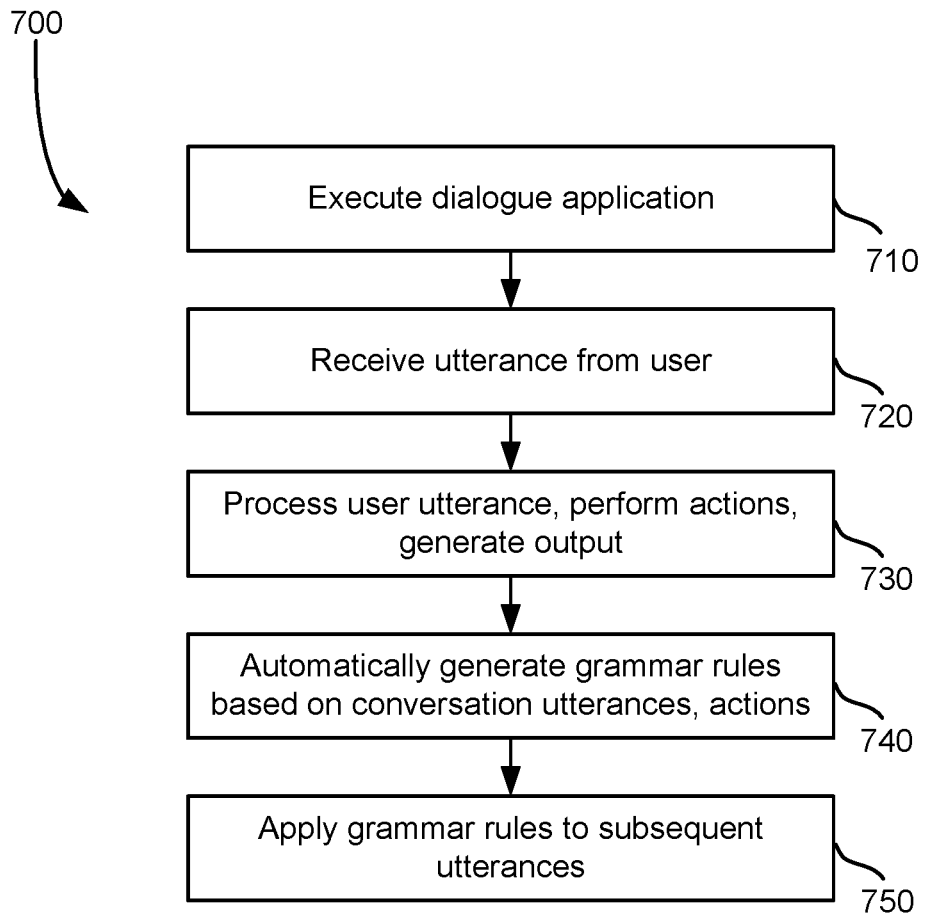
FIG. 7 is an exemplary method for providing an automated dialogue agent.

FIG. 7 is an exemplary method for providing an automated dialogue agent. A dialogue application is executed at step 710. In some examples, executing the dialogue application may include establishing a dialogue session between an application executing on a server and a remote machine, the dialogue session including one or more utterances received from a user at the remote machine (e.g., a dialogue of utterances between the application and input utterances received from the user at the remote machine). The dialogue application, which can be implemented by application 162 in the system of FIG. 1A and/or FIG. 1B, may be initiated, configured with pre-existing grammar rules, and otherwise prepared to interact with the user, in some instances in a particular domain such as travel, computer health assistance, and so forth. In some instances, an initial utterance or message may be provided by the application to the user once the dialogue application starts, such as for example "how can I help you today?"

An utterance is received from a user by the application at step 720. In some examples, the utterance is received from a remote machine by the application on the server, in the form of a computer-readable representation of the utterance initiated by the user. The computer-readable representation of the utterance may include any combination of digital and/or analog audio data (e.g., raw, beam-formed, and/or preprocessed audio data), phoneme data, text data, machine-learning word embedding data, and/or any other suitable computer-readable representation of the phonological, lexical, syntactic, and/or semantic content of the utterance. The utterance may include a message or request that is received from an input device such as a microphone, keyboard, touchpad, or other input device. A non-limiting example of an utterance is "I would like to book a flight to Dallas."

The user utterance is processed, actions are performed, and an output is generated at step 730. Processing the utterance may include parsing the utterance to determine the utterance contents, determining one or more actions to take in response to the utterance, generating a response to provide to the user that provided the utterance to inform the user the request is being processed "(e.g., "let's see . . . "), and performing user-facing actions, such as providing a response to a user, and external facing actions such as obtaining one or more flights that meet certain criteria. Processing the user utterance is discussed in more detail below with respect to the method of FIG. 8.

After processing the utterance, grammar rules are automatically generated based on the conversation utterances and actions at steps 740. Generating grammar rules may include updating previous rules or generating new grammar rules. The generated grammar rules can then be stored and applied to subsequent dialogue, in the present conversation and other conversations, at steps 750. In some examples, grammar rules may be associated with a confidence value and/or confidence function, e.g., a previously-trained machine learning function configured to assess a confidence that the grammar rule should be applied to an utterance. In some examples, new grammar rules are generated by NLP machine 182, dialogue expansion machine 180, and/or previously-trained machine learning confidence model 185. For example, new grammar rules may be generated by dialogue expansion machine 180 by updating a previous grammar rule based on successfully performing an action responsive to an utterance, e.g., by increasing a confidence for applying the previous grammar rule to the utterance in a subsequent interaction. More generally, grammar rules may be represented by any suitable combination of state-of-the-art and/or future machine learning (ML), artificial intelligence (AI), and/or natural language processing (NLP) techniques. For example, grammar rules may be applied based on one or more machine learning classifiers, where each machine learning classifier is trained to receive a computer-readable representation of an utterance and to output a confidence that the grammar rule should be applied to the utterance.

Figure 8:
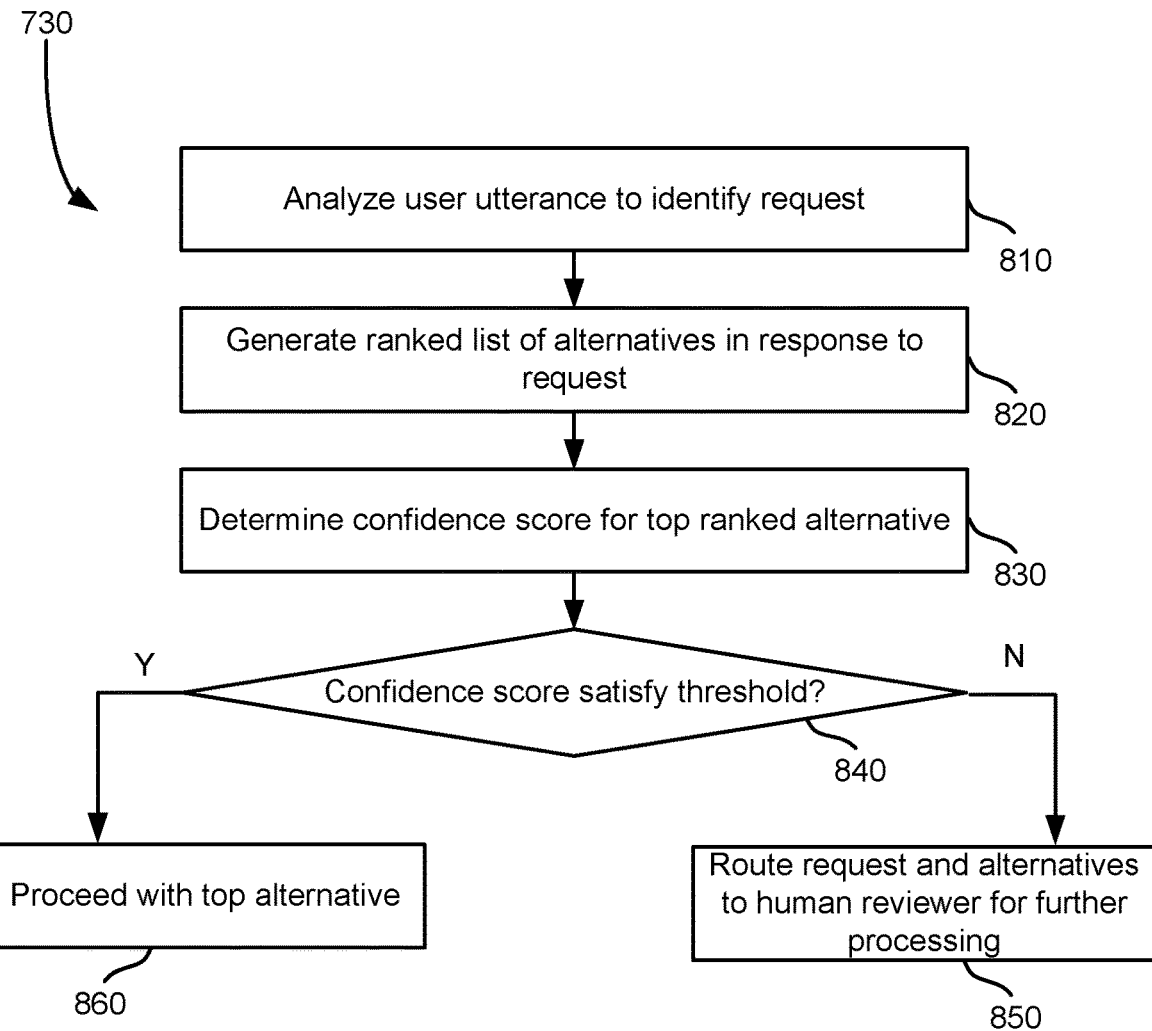
FIG. 8 is an exemplary method for processing a user utterance.

FIG. 8 is an exemplary method for processing a user utterance. The method of FIG. 8 provides more detail for step 730 of the method of FIG. 7. A user utterance is analyzed to identify a request at step 810. The request may be a request for a flight, a hotel, or some other request received from a user interreacting with the dialogue application.

In some examples, processing the user utterance includes operating NLP machine 182 to identify a request in the utterance, e.g., by identifying an intent of a request associated with the computer-readable representation of the utterance, and/or by identifying one or more entities mentioned in the utterance.

A ranked list of alternatives is generated in response to the request at step 820. Each alternative may include a root function or action as well as, optionally, one or more actions to be taken as part of the response to the user request. The actions may include end-user actions that provide a response to the user as well as backend actions that interact and/or communicate with other components, applications, and machines. In some examples, generating the ranked list of alternatives includes operating a dialogue expansion machine (e.g., dialogue expansion machine 180) to generate a plurality of alternatives for responding to the request, and operating a previously-trained machine learning confidence model to assess a confidence score for each alternative of the plurality of alternatives. Accordingly, the alternatives may be ranked according to the confidence scores, e.g., so as to select a top-ranked alternative having a highest confidence score.

A confidence score is determined for one or more alternatives (e.g., by generating a confidence score for the top-ranked alternative of the plurality of alternatives and optionally for each other alternative) at step 830. The confidence score may be determined based on several factors, including the requests text, clues in the dialogue, the user's identity, and random factors. More details for determining a confidence score is discussed with respect to the method of FIG. 9.

A determination is made as to whether the confidence score satisfies a threshold at step 840. In some instances, the top ranked alternative may be executed without any further consideration if it satisfies a threshold. If the top ranked alternative does not satisfy the threshold, further processing, including review by a human user and/or human reviewer, can be performed. For example, one or more of the alternatives (e.g., the top alternative or a small plurality of the highest ranked alternatives including the top alternative, or any other suitable subset of the alternatives) may be provided to a remote machine for advice from a human reviewer. In some examples, the human reviewer is the human user who originally uttered the requested, for selection of a correct alternative. Alternately or additionally, the one or more of the alternatives may be provided to one or more other human reviewers (e.g., human users at different remote machines) for selection of a correct alternative. Accordingly, processing a user utterance may further include receiving input from the human reviewer(s) (e.g., input provided at the remote machine or at any other computing device(s) associated with the human reviewers). The received input may indicate a selection of one of the plurality of alternatives. The alternative selected by the human reviewer(s) may be the top alternative, or may be a different, non-top alternative other than the top alternative.

The threshold may be set per designer's preference. In some instances, the threshold may initially be set to a higher level, such as 95%, to ensure that mistakes with selecting alternatives to proceed with are minimized. After more data is gathered by the system, the threshold may be lowered, for example to 80%, as the system is better able to determine how to respond to user requests. The technique for calculating the confidence score can be implemented using suitable combination of state-of-the-art and/or future machine learning (ML), artificial intelligence (AI), and/or natural language processing (NLP) techniques.

If the confidence score satisfies the threshold, the system may proceed with the top alternative in responding to the user's request at step 860. Accordingly, the system may execute computer-readable instructions defining the top alternative (e.g., instructions to perform an assistive task associated with the top alternative).

If the confidence score does not satisfy the threshold, the request and alternatives may be further processed at step 850. More details for routing the request for further processing is discussed with respect to the method of FIG. 10. After the further processing, the system may recognize a selected alternative (e.g., based on selection by one or more human reviewers). Accordingly, the system may execute computer-readable instructions defining the selected alternative (e.g., instructions to perform an assistive task associated with the selected alternative).

Figure 9:
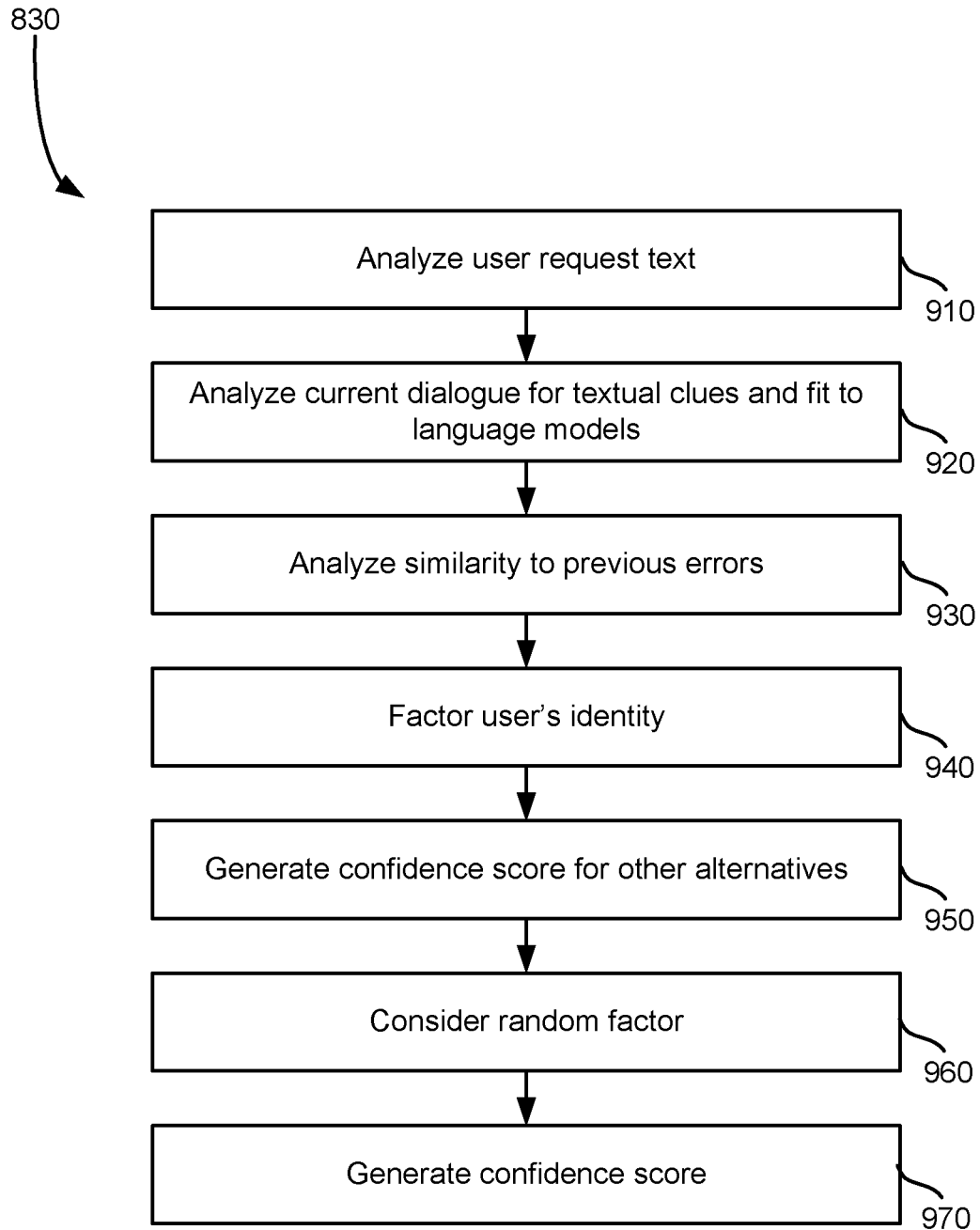
FIG. 9 is an exemplary method for determining a confidence score.

FIG. 9 is an exemplary method for determining a confidence score. The method of FIG. 9 provides more detail for step 830 of the method of FIG. 8. User request text is analyzed at step 910. Analyzing a user request may include determining how much of the text is understood and how much of the text is not known. A user request with known text will contribute to a higher confidence score as opposed to user text having portions of text that are not understood. The current dialogue is then analyzed for textual clues and fit to language models at step 920. A current dialogue with several recognizable clues and one that fits to a pre-existing language model will be more likely to have a higher confidence score.

The alternative is analyzed to determine similarity to previous alternatives that resulted in errors at step 930. If the selected alternative is similar to previous alternatives that have caused errors, that will reduce the confidence score for the current alternative. A user's identity is factored into the score at step 940. If a user is a new user or user that pays for a dialogue service, it can be important to provide the user with a higher level of service, and therefore the confidence score might be lowered to make it more likely that the alternative will be analyzed and/or reviewed by a human user and/or human reviewer.

A confidence score can be generated for the other alternatives using one or more factors discussed with respect to method FIG. 9 at step 950. If one or more other alternatives have a similar confidence score as the selected alternative, the alternatives may be more likely to be transmitted to a human user and/or human reviewer at a remote machine to confirm which is the best alternative. In some instances, if the alternative has a much higher confidence score than the other alternatives, then the alternative may be more likely to satisfy a confidence threshold.

A random factor may be considered in the confidence score at step 960. In some instances, a system in administrator may want a minimum number of user requests, such as one of every three requests, to be reviewed by a human user and/or human reviewer. In this case, the random factor may randomly lower the confidence score for a top selected alternative to ensure that that alternative is reviewed by a human user and/or human reviewer. After the factors of steps 910-960 have been analyzed and considered, a confidence score for the selected alternative is generated at step 970.

It should be understood that the factors listed in the method of FIG. 9 are exemplary, and that additional or fewer factors may be used in different implementations of the present system. Further, it should be understood that the factors may not be considered equally, and that one or more of the factors may be weighted to be considered more important than one or more other factors.

Figure 10:
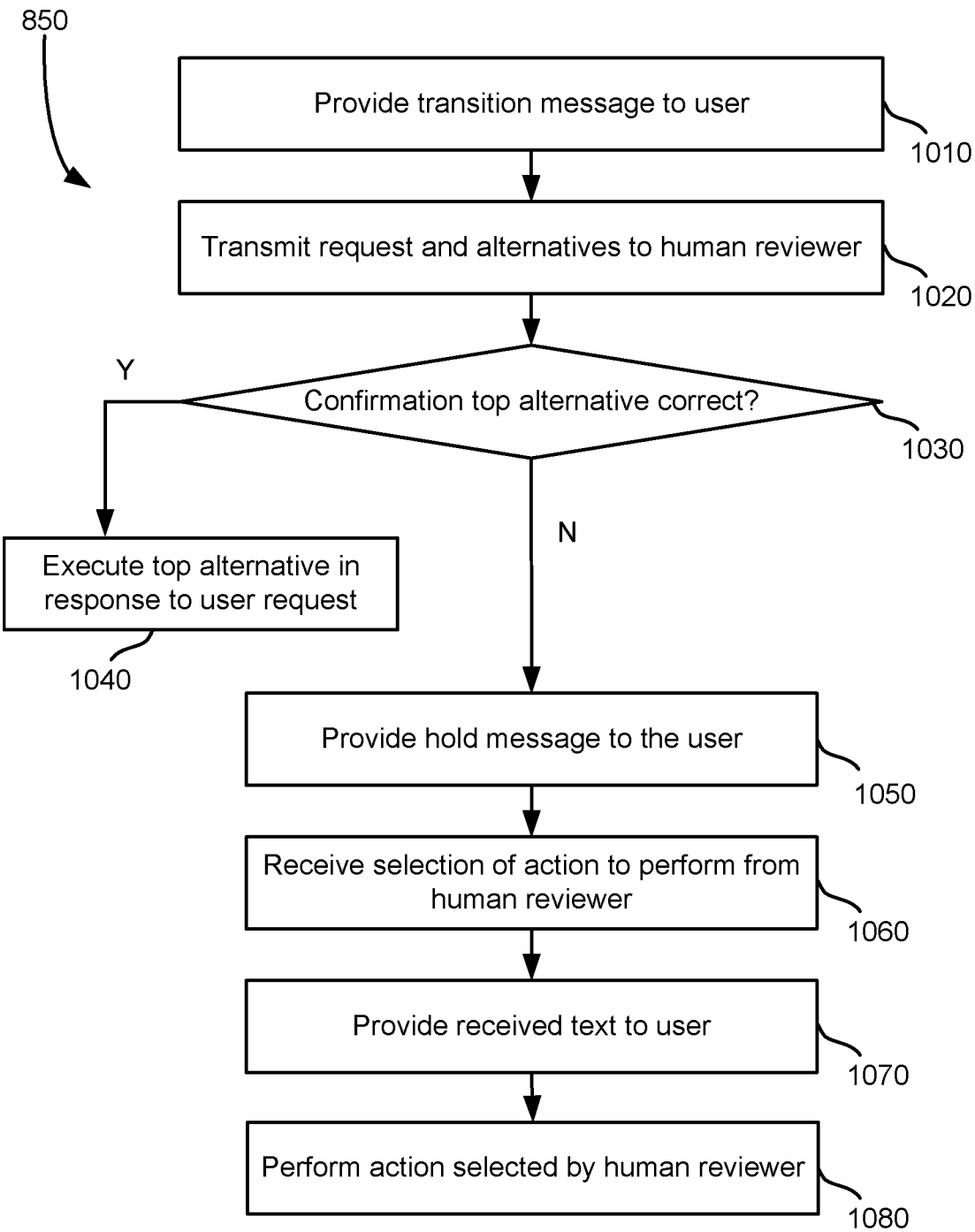
FIG. 10 is an exemplary method for human review of a request.

FIG. 10 is an exemplary method for facilitating review, by a human reviewer, of the alternatives generated for a user request. The human reviewer may be the user who originally submitted the request, or any other human user (e.g., a voluntary and/or paid reviewer). The method of FIG. 10 provides more detail for step 850 of the method FIG. 8. First, a transition message is provided to the user at step 1010. The transition message may inform the user directly or indirectly that a response may take a bit longer than usual. Non-limiting examples of transition messages include: a graphical spinner, a series of extending dots, and/or a text message that indicates "just a moment."

The user request and generated alternatives are transmitted to a computing device (e.g., a remote machine) associated with the human reviewer at step 1020. They may be transmitted to the human reviewer through email, a mobile application, a webpage, or in some other manner.

Input is received from the human reviewer indicating whether the top alternative is confirmed to be correct at step 1030. If input from the human reviewer is received that confirms the top alternative of the generated alternative is the correct response to the user request, an indication that the top alternative is provided to the dialogue application, which in turn executes the top alternative in response to the user request at step 1040.

If the top alternative is not considered to be correct, a hold message may be provided to the user at step 1050. The hold message may indicate an initial response to the user, such "hold on for a few seconds." A selection of an action to perform in response the request is received from the human reviewer at step 1060. The action may include a user-facing action or a back-end action, such as determining a city, flight information, hotel information, or some other action to obtain a result, in response to the user request. The human reviewer text response is provided to the user at step 1070 and the action selected by the human reviewer is performed at step 1080.

In some instances, human review may be performed more than once for a particular user request. As such, the list of alternatives and corresponding actions can be sent to a plurality of human reviewers, and a response can be received from each human reviewer. The resulting alternative, and/or selected action to take in response to the user request, may be the most commonly selected alternative or action received from the plurality of human reviewers.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 11:
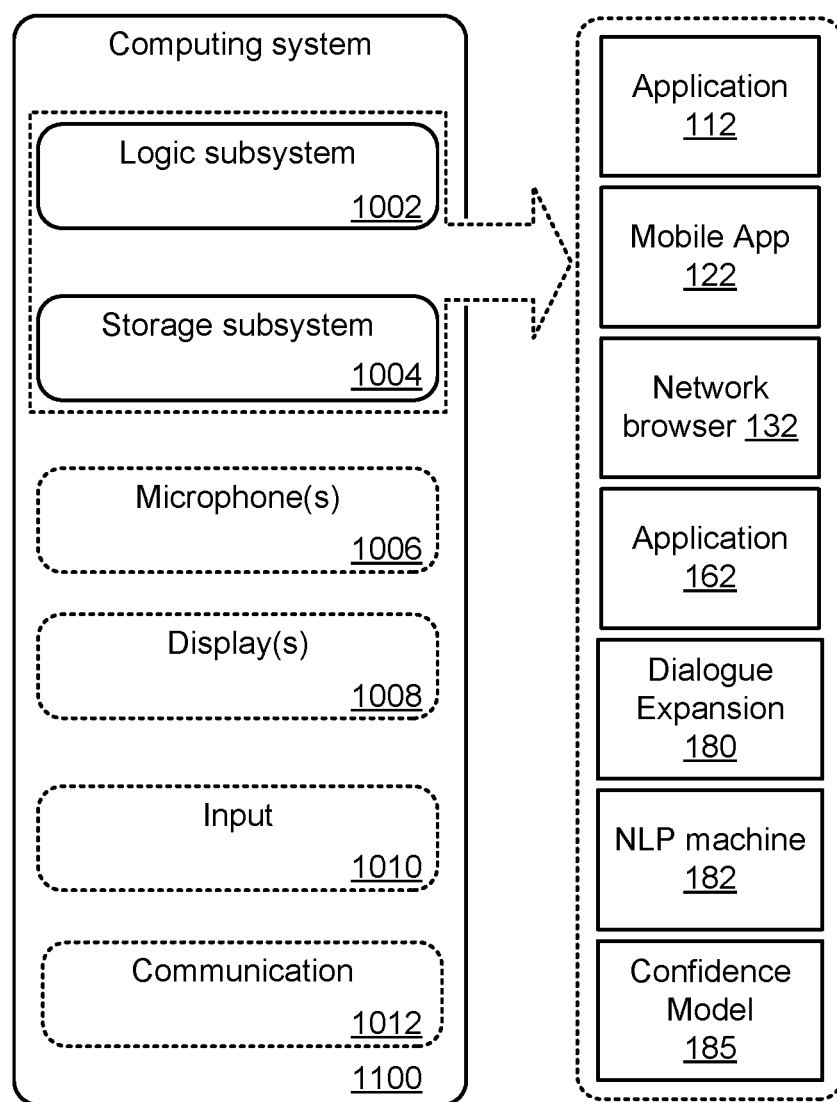
FIG. 11 is a block diagram of an exemplary system for implementing the present technology.

Computing system 1100 from FIG. 11 is a computer system configured to provide any to all of the compute functionality described herein. Computing system 1100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 1100 may be a stand-alone or cloud-supported computerized intelligent assistant.

Computing system 1100 includes a logic subsystem 1002 and a storage subsystem 1004. Computing system 1100 may optionally further include a microphone 1006. Computing system 1100 may optionally include a display subsystem 1008, input subsystem 1010, communication subsystem 1012, and/or other subsystems not shown in FIG. 11.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration. Logic subsystem 1002 may include any combination of logic subsystems of the devices of computing subsystem 100. Accordingly, the methods and processes described herein may be implemented using any suitable cooperation by these logic subsystems, e.g., portions of the methods and processes described herein may be enacted by executing instructions at one or more of these logic subsystems.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data. Storage subsystem 1004 may include any combination of storage subsystems of the devices of computing system 100. Accordingly, the methods and processes described herein may be implemented using any suitable cooperation by these storage subsystems, e.g., data may be replicated and/or distributed across these storage subsystems in any suitable manner to facilitate the methods and processes described herein.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines, models, and/or applications. For example, logic subsystem 1002 and storage subsystem 1004 of computing system 1100 are configured to instantiate natural language processing machine 182, dialogue expansion machine 180, and previously-trained machine-learning confidence model 185, as well as application 112, mobile application 122, network browser application 132, and/or application 162. As used herein, the terms "machine" and "model" are used to collectively refer to hardware and any software, instructions, and/or other components cooperating with such hardware to provide computer functionality. In other words, "machines" and "models" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines, models, and/or applications may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines and/or language models include maximum likelihood models, maximum entropy models, support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, super-segmental models (e.g., hidden dynamic model)).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback), generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

For example, a dialogue system according to the present disclosure may be trained to interact with different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, display subsystem 1008 may be used to present a visual representation of data held by storage subsystem 1004. This visual representation may take the form of a graphical user interface (GUI). Display subsystem 1008 may include one or more display devices utilizing virtually any type of technology. In some implementations, display subsystem may include one or more virtual-, augmented-, or mixed reality displays.

When included, input subsystem 1010 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones (e.g., a microphone, stereo microphone, position-sensitive microphone and/or microphone array) for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1012 may be configured to communicatively couple computing system 1100 with one or more other computing devices. Communication subsystem 1012 may include wired and/or wireless communication devices compatible with one or more different communication protocols. The communication subsystem may be configured for communication via personal-, local- and/or wide-area networks.

The invention claimed is:

1. A method for a computerized dialogue system, comprising:
    establishing a dialogue session between an application executing on a server and a first remote machine, the dialogue session including one or more utterances received from a user at the first remote machine;
    receiving from the first remote machine, by the application on the server, a computer-readable representation of an utterance by the user;
    operating, by the application on the server, a natural language processing machine to identify a request associated with the computer-readable representation of the utterance;
    operating, by the application on the server, a dialogue expansion machine to generate a plurality of alternatives for responding to the request;
    operating, by the application on the server, a previously-trained machine learning confidence model to assess a confidence score for each alternative of the plurality of alternatives, wherein a top alternative of the plurality of alternatives has a highest confidence score;
    transmitting the plurality of alternatives including the top alternative to a second remote machine in response to determining that the highest confidence score for the top alternative of the plurality of alternatives does not satisfy a threshold; and
    executing computer-readable instructions defining a selected alternative of the plurality of the alternatives based on input received from a human reviewer at the second remote machine.

2. The method of claim 1, wherein the first remote machine and the second remote machine are the same remote machine, and wherein the human reviewer is the human user.

3. The method of claim 1, wherein the first remote machine and the second remote machine are different remote machines, and wherein the human reviewer is not the human user.

4. The method of claim 1, further comprising:
    automatically generating grammar rules from the utterance and response; and
    applying the automatically generated grammar rules to subsequent requests when generating alternatives to responding to the subsequent requests.

5. The method of claim 4, further comprising:
    receiving from the first remote machine, by the application on the server, a subsequent utterance by the user;
    operating, by the application on the server, the natural language processing machine to identify a subsequent request associated with the subsequent utterance;
    operating, by the application on the server, the dialogue expansion machine to generate a plurality of alternatives for responding to the subsequent request, based on the automatically generated grammar rules;

operating, by the application on the server, the confidence model to assess a confidence score for each alternative of the plurality of alternatives for responding to the subsequent request, wherein a top alternative of the plurality of alternatives for responding to the subsequent request has a highest confidence score; and executing computer-readable instructions defining the top alternative in response to the subsequent request in response to determining that the confidence score for the top alternative satisfies a second threshold.

6. The method of claim 1, wherein the selected alternative is not the top alternative.

7. The method of claim 1, further comprising receiving, from the first remote machine, a computer-readable indication of a selection of an alternative of the plurality of alternatives, based on input received from the user at the first remote machine.

8. The method of claim 1, further comprising:
transmitting the plurality of alternatives to a plurality of users;
receiving, from each user of the plurality of users, an alternative selected by that user; and
executing computer-readable instructions defining a final selected alternative as the alternative of the plurality of alternatives that was most often selected by the plurality of users.

9. The method of claim 1, wherein the confidence score is generated based on user text representing understood and unknown portions of the user request, wherein the confidence score is relatively higher responsive to a relatively higher proportion of the user text representing understood portions of the user request.

10. A storage subsystem holding instructions executable by a logic subsystem, the instructions comprising:
instructions to establish a dialogue session between an application executing on a server and a first remote machine, the dialogue session including one or more utterances received from a user at the first remote machine;
instructions for the application on the server to receive, from the first remote machine, a computer-readable representation of an utterance by the user;
instructions for the application on the server to operate a natural language processing machine to identify a request associated with the utterance;
instructions for the application on the server to operate a dialogue expansion machine to generate a plurality of alternatives for responding to the request;
instructions for the application on the server to operate a a previously-trained machine learning confidence model to assess a confidence score for each alternative of the plurality of alternatives, wherein a top alternative of the plurality of alternatives has a highest confidence score;
instructions for the application on the server to transmit the alternatives to a second remote machine in response to determining that the highest confidence score for the top alternative of the plurality of alternatives does not satisfy a threshold; and
instructions for the application on the server to execute further computer-readable instructions defining a selected alternative of the plurality of the alternatives, based on input received from a human reviewer at the second remote machine.

11. The storage subsystem of claim 10, wherein the selected alternative is not the top alternative.

12. The storage subsystem of claim 10, the method further comprising receiving, from the first remote machine, a computer-readable selection of an alternative of the plurality of alternatives, based on input received from the user at the first remote machine.

13. The storage subsystem of claim 10, the instructions further comprising:
instructions to transmit the plurality of alternatives to a plurality of users;
instructions to receive, from each user of the plurality of users, a selected alternative selected by that user; and
instructions to execute further computer-readable instructions defining a final selected alternative as the alternative of the plurality of alternatives that was most often selected by the plurality of users.

14. The storage subsystem of claim 10, the instructions further comprising:
instructions to automatically generate grammar rules from the utterance and response; and
instructions to apply the automatically generated grammar rules to subsequent requests when generating alternatives to responding to the subsequent requests.

15. The storage subsystem of claim 14, the instructions further comprising:
instructions to receive from the first remote machine, by the application on the server, a subsequent utterance by the user;
instructions to operate, by the application on the server, the natural language processing machine to identify a subsequent request associated with the subsequent utterance;
instructions to operate, by the application on the server, the dialogue expansion machine to generate a plurality of alternatives for responding to the subsequent request, based on the automatically generated grammar rules;
instructions to operate, by the application on the server, the confidence model to assess a confidence score for each alternative of the plurality of alternatives for responding to the subsequent request, wherein a top alternative of the plurality of alternatives for responding to the subsequent request has a highest confidence score; and
instructions to execute further computer-readable instructions defining the top alternative, in response to the subsequent request in response to determining that the confidence score for the top alternative satisfies a second threshold.

16. The storage subsystem of claim 10, wherein the confidence score is generated based on user text representing understood and unknown portions of the user request, wherein the confidence score is relatively higher responsive to a relatively higher proportion of the user text representing understood portions of the user request.

17. A dialogue system, comprising:
a communication subsystem configured to:
establish a dialogue session between an application executing on a server and a first remote machine, the dialogue session including one or more utterances received from a user at the first remote machine; and
receive from the remote machine, by the application on the server, a computer-readable representation of an utterance by the user;
a natural language processing machine configured to identify a request associated with the utterance;

a dialogue expansion machine configured to generate a plurality of alternatives for responding to the request;

a machine learning confidence model previously-trained to assess a confidence score for each alternative of the plurality of alternatives such that a top alternative of the plurality of alternatives is assessed with a highest confidence score;

wherein the communication subsystem is further configured to transmit the alternatives to a second remote machine in response to determining that the highest confidence score for the top alternative of the plurality of alternatives does not satisfy a threshold; and the dialogue system further comprising a logic subsystem configured to execute computer-readable instructions defining a selected alternative of the plurality of the alternatives based on input received from a human reviewer at the second remote machine.

18. The dialogue system of claim 17, wherein the communication subsystem is further configured to:

transmit the plurality of alternatives to a plurality of users;

receive, from each user of the plurality of users, an alternative selected by that user; and execute computer-readable instructions defining a final selected alternative as the alternative of the plurality of alternatives that was most often selected by the plurality of users.

19. The dialogue system of claim 17, wherein the dialogue expansion machine is configured to automatically generate grammar rules from the utterance and response and apply the automatically generating grammar rules to subsequent requests when generating alternatives to responding to the subsequent requests.

20. The dialogue system of claim 19, wherein:

the communication subsystem is further configured to receive, from the first remote machine, a subsequent utterance by the user;

the natural language processing machine is further configured to identify a subsequent request associated with the subsequent utterance;

the dialogue expansion machine is further configured to generate a plurality of alternatives for responding to the subsequent request, based on the automatically generated grammar rules;

the confidence model is further configured to assess a confidence score for each alternative of the plurality of alternatives for responding to the subsequent request, wherein a top alternative of the plurality of alternatives for responding to the subsequent request has a highest confidence score; and the logic subsystem is further configured to execute computer-readable instructions defining the top alternative in response to the subsequent request in response to determining that the confidence score for the top alternative satisfies a second threshold.

* * * * *